(12) United States Patent
Allred, III et al.

(10) Patent No.: US 8,448,748 B2
(45) Date of Patent: May 28, 2013

(54) ULTRA LIGHTWEIGHT SEGMENTED LADDER/BRIDGE SYSTEM

(75) Inventors: Jimmie B. Allred, III, Skaneateles, NY (US); Joseph Kummer, Fayetteville, NY (US); Michael D. Griswold, Syracuse, NY (US); Michael J. Hall, Camillus, NY (US); Matthew A. Bush, LaFayette, NY (US)

(73) Assignee: Allred & Associates, Inc., Elbridge, NY (US)

( * ) Notice: Subject to any disclaimer, the term of this patent is extended or adjusted under 35 U.S.C. 154(b) by 537 days.

(21) Appl. No.: 12/646,026

(22) Filed: Dec. 23, 2009

(65) Prior Publication Data

US 2010/0163340 A1    Jul. 1, 2010

Related U.S. Application Data

(60) Provisional application No. 61/141,402, filed on Dec. 30, 2008, provisional application No. 61/151,327, filed on Feb. 10, 2009.

(51) Int. Cl.
*E06C 1/39* (2006.01)
*E06C 1/00* (2006.01)
*E06C 7/00* (2006.01)

(52) U.S. Cl.
CPC ... *E06C 1/00* (2013.01); *E06C 7/00* (2013.01); *E06C 1/39* (2013.01)
USPC ........... 182/152; 182/115; 182/116; 182/117; 182/118; 182/119; 182/156

(58) Field of Classification Search
USPC ................. 182/115, 116, 117, 118, 119, 152, 182/156
See application file for complete search history.

(56) References Cited

U.S. PATENT DOCUMENTS

| | | | | | |
|---|---|---|---|---|---|
| 1,894,489 | A | * | 1/1933 | Jun et al. | 182/23 |
| 2,024,039 | A | * | 12/1935 | Harting | 182/27 |
| 2,654,487 | A | * | 10/1953 | Degener | 211/188 |
| 2,815,043 | A | * | 12/1957 | Carmichael et al. | 138/144 |
| 2,862,650 | A | * | 12/1958 | Scott et al. | 182/46 |
| 2,885,132 | A | * | 5/1959 | Campbell | 182/46 |
| 2,900,041 | A | | 8/1959 | Leavitt et al. | |
| 3,084,761 | A | * | 4/1963 | Robertson | 182/178.6 |
| 3,085,649 | A | * | 4/1963 | Gillman | 182/46 |
| 3,554,318 | A | * | 1/1971 | Knight | 182/24 |
| 3,674,110 | A | * | 7/1972 | Cooke | 182/46 |
| 3,995,714 | A | | 12/1976 | Brookes et al. | |
| 4,029,172 | A | * | 6/1977 | Green | 182/46 |

(Continued)

OTHER PUBLICATIONS

Werner Fibreglass Sectional Ladder. Model No. PFSL3. Oct. 2007.

(Continued)

*Primary Examiner* — Katherine Mitchell
*Assistant Examiner* — Colleen M Chavchavadze
(74) *Attorney, Agent, or Firm* — Brown & Michaels, PC

(57) ABSTRACT

A dual-use ladder and bridge modular system preferably includes tubes, gussets, flanges, and/or joints. In a preferred embodiment, the tubes, gussets, flanges, and/or joints are made of carbon fiber. A method connects and disconnects modular carbon fiber ladder segments. Another method creates a lightweight carbon-fiber beam with exceptionally high stiffness and strength using a combination of carbon-fiber braid material, uni-directional cloth, and pultruded carbon-fiber strips. A carbon fiber ladder segment and tube connectors are also disclosed.

56 Claims, 39 Drawing Sheets

U.S. PATENT DOCUMENTS

| | | | | |
|---|---|---|---|---|
| 4,070,020 | A * | 1/1978 | Dano | 473/536 |
| 4,291,784 | A * | 9/1981 | Moses | 182/178.6 |
| 4,371,055 | A * | 2/1983 | Ashton et al. | 182/46 |
| 4,917,216 | A | 4/1990 | Kimber | |
| 5,086,872 | A * | 2/1992 | Lin | 182/18 |
| 5,163,532 | A * | 11/1992 | McCarty | 182/163 |
| 5,279,387 | A * | 1/1994 | Swiderski et al. | 182/27 |
| 5,358,069 | A * | 10/1994 | Krause | 182/118 |
| 5,495,915 | A | 3/1996 | Weston et al. | |
| 5,711,131 | A | 1/1998 | Thomas | |
| 5,711,400 | A * | 1/1998 | Tan | 182/119 |
| 5,954,157 | A * | 9/1999 | Grimes et al. | 182/163 |
| 6,131,700 | A * | 10/2000 | Farner | 182/222 |
| 6,321,501 | B1 | 11/2001 | Ignash | |
| 7,469,513 | B2 | 12/2008 | Schipani et al. | |
| 7,694,374 | B2 * | 4/2010 | Jones et al. | 14/2.4 |
| 8,028,488 | B2 | 10/2011 | Dodd | |
| 2001/0015304 | A1 * | 8/2001 | Hobbs | 182/195 |
| 2008/0023268 | A1 * | 1/2008 | Kelly et al. | 182/194 |
| 2009/0007348 | A1 * | 1/2009 | Woodmansee et al. | 14/2.4 |
| 2010/0071996 | A1 * | 3/2010 | Huang | 182/118 |

OTHER PUBLICATIONS

Bauer Corporation Series 333 Type I Fiberglass Parallel Sectional Ladder. Aug. 2006. http://www.bauerladder.com/series333.html.

Bauer Corporation Series Series 339 Type IAA* Fiberglass Tapered Sectional Ladder. Aug. 2006. http://www.bauerladder.com/series339.html.

Werner Fiberglass Sectional Ladder. Model No. S7900. 2004 http://www.wernerladder.com/catalog/details.php.

Telesteps telescoping ladder. 2001 http://web.archive.org/web/20011129215912/http://www.telesteps.net/.

Telesteps 1600 Ladder Instructions. 2007.

Telesteps Combi Ladders. 2007 http://bottomline2000.com/telestepscombiladders.aspx.

Telesteps Combi Ladders. Use and Care Instructions. 2007.

Cima Ladder. Apr. 2007 http://www.cimaladder.com/about_cima.html.

Portal Ladder™ System. 2006 http://www.portalladder.com/ladder/index.asp.

Portal Ladder™ Boarding Ladder™ 2006 http://www.portalladder.com/navy/index.asp.

QuikStep Assault Ladder 8ft with 18" Rung Black. 2007 http://www.legear.com.au/QuikStep-Assault-Ladder-8ft-with-18-Rung-Black-p/qsl-818bk.htm.

CamLock Engineering, Multi-Level Team Entry Extension Ladders. 2004 http://www.tacticalsystems.co.uk/teamentryladders.asp.htm.

CamLock Engineering, Multi-Level Lightweight Portable Extension Ladders. 2004 http://www.tacticalsystems.co.uk/portableladders.asp.htm.

CamLock Engineering, CAL Multi-Level Sectional Combination Ladders, Narrow CAL Type. 2004 http://www.tacticalsystems.co.uk/combinationladders.asp.htm.

CamLock Engineering, TAL Multi-Level Sectional Combination Ladders, Triple Stile Type. 2004 http://www.tacticalsystems.co.uk/combinationladders.asp.htm.

Up-Up telescoping ladder. Mar. 2007. http://www.core-distribution.com/index3.html.

Xtend & Climb Telescoping Ladder. Oct. 2003 http://www.xtendandclimb.com/.

Telescopic Assault Ladder MKII. Oct. 2006 http://www.finnrappel.fi/ladders1.htm.

Command Arms Accessories. Tactical Ladder. 2007 http://www.commandarms.com/product.asp?pID=231&cID=58&c=4819.

GMT Composites Swimming/Boarding Ladders. Jun. 2003 http://www.gmtcomposites.com/boarding/ladders.

Jassco Folding Ladder 2010 http://www.jassco-llc.com/ladders.htm.

Yates Professional—Special Ops Ladder. 2006 http://web.archive.org/web/20060311060334/www.yatesgear.com/rescue/tactical/ladder/index.htm.

Folding Pole Ladder System with Folding Steps. 2006 http://www.cuttingedgetactical.com/foldingpoleladdersystemwithfoldingsteps.aspx.

Folding Rung Ladder System. 2006 http://www.cuttingedgetactical.com/foldingrungladdersystem.aspx.

Solid Ladder Systems. 2006 http://www.cuttingedgetactical.com/solidladdersystems.aspx.

Dual Man Ladder. 2006 http://www.cuttingedgetactical.com/dualmanladder.aspx.

CQB Scaling Ladder, Folding. 2008 http://www.awsin.com/products.asp?id=137.

AWS Combat Assault Ladder System. 2005 http://web.archive.org/web/20050512133933/awsin.com/la/lasub/cal.php.

A6218 607cm DW Assault Ladder. 2006. http://www.awsin.com/proddetail.asp?prod=A6218.

Little Giant. Tactical Ladder Model 22. 2006 http://www.littlegiantladders.com/products/view/29.

Velocity Assault Ramp. 2006 http://www.velocityladders.com/products/view/3.

Velocity Tactical Ladder Model 26. 2006 http://www.velocityladders.com/products/view/48.

COBRA Marine Boarding Ladder. 2008 http://www.apollomilitary.com/index.php/products/1/60/cobra_marine_boarding_ladder.

* cited by examiner

240

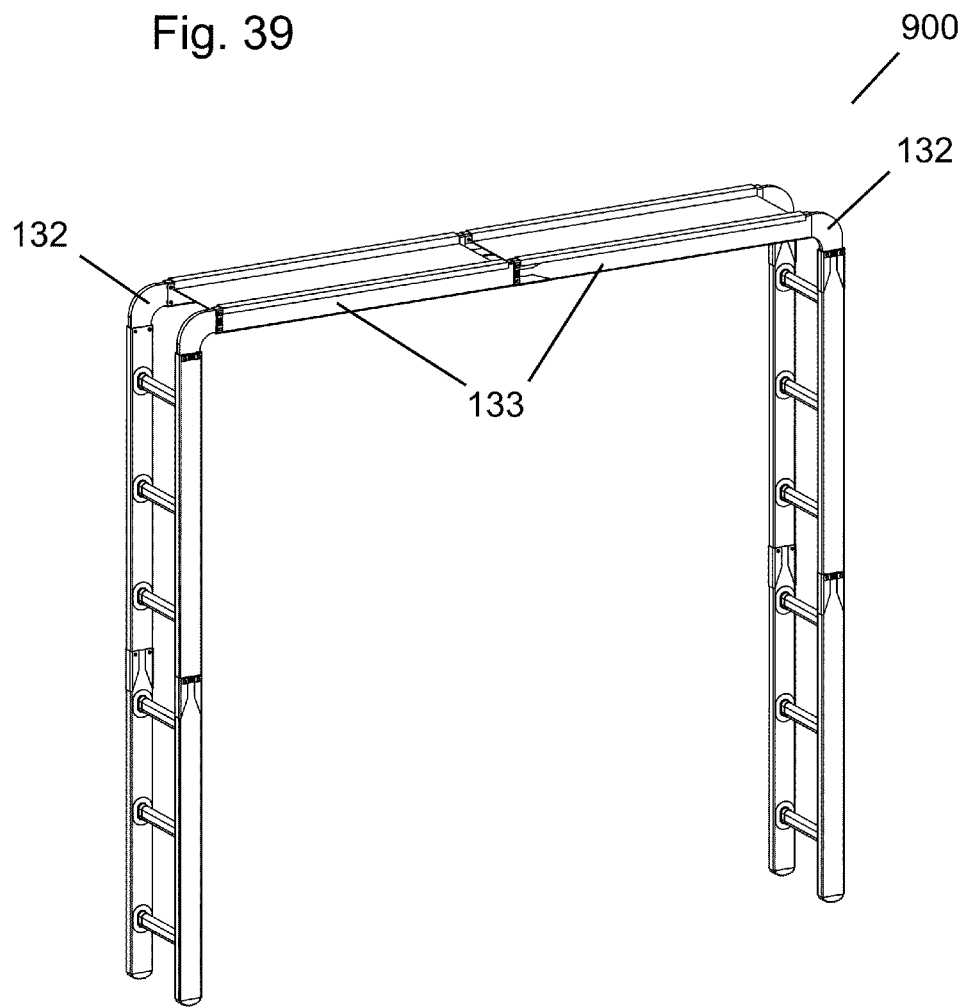

ULTRA LIGHTWEIGHT SEGMENTED LADDER/BRIDGE SYSTEM

REFERENCE TO RELATED APPLICATIONS

This application claims one or more inventions which were disclosed in Provisional Application No. 61/141,402, filed Dec. 30, 2008, entitled "DUAL-USE MODULAR CARBON-FIBER LADDER AND BRIDGE" and Provisional Application No. 61/151,327, filed Feb. 10, 2009, entitled "ULTRA LIGHTWEIGHT SEGMENTED LADDER/BRIDGE SYSTEM". The benefit under 35 USC §119(e) of the United States provisional applications is hereby claimed, and the aforementioned applications are hereby incorporated herein by reference.

BACKGROUND OF THE INVENTION

1. Field of the Invention

The invention pertains to the field of ladders and bridges. More particularly, the invention pertains to a segmented ladder and bridge system.

2. Description of Related Art

The use of ladders and small bridges is commonplace in commercial and military applications. Unfortunately, long ladders tend to be heavy and difficult to transport. In addition, units designed as ladders are not strong enough to be laid flat and used as a walking bridge or scaffolding. One solution to improve portability is to use a segmented ladder.

Segmented ladders are comprised of several smaller ladder sections, which are aligned and secured together to form a longer ladder at the time of use. The benefit of such a design is that, instead of transporting, for example, a single 20-foot long ladder, one can separately transport four five-foot sections, which are assembled only when needed. This allows ladders to be carried within cars, trucks, helicopters, and other vehicles with relative ease.

Several patents exist for segmented ladder designs. Leavitt and Whitehurst, U.S. Pat. No. 2,900,041, entitled "SECTIONAL LADDERS", issued Aug. 18, 1959, discloses a simple, inexpensive sectional ladder that includes telescoping sleeve-type joints with a snap-action locking mechanism. Brookes et al., U.S. Pat. No. 3,995,714, entitled "MULTI-SECTION LADDER FOR SCALING POLES", issued Dec. 7, 1976, discloses a multi-section ladder specifically for scaling poles. In this design, the main support rail runs along the center of the ladder, and the rungs are supported mid-span. Extending the work by Leavitt, U.S. Pat. No. 4,917,216, Kimber, entitled "SEGMENTED LADDER CONSTRUCTION", issued Apr. 17, 1990, discloses a multi-step ladder construction unit with side rails, cross members joined at the ends, and telescopic ends for insertion into additional segments. A primary goal of this patent was to develop a system that was manufacturable at low cost.

Several segmented ladders are available commercially, including the Bauer Corporation Series 333 fiberglass parallel section ladder and Series 339 fiberglass tapered sectional ladder (Bauer Corporation, Wooster, Ohio), the S7900 series fiberglass sectional ladder from Werner Corporation (Werner Co., Greenville, Pa.), and the six-section surveyors ladder from Midland Ladder Co. Ltd (Birmingham, UK).

In addition to segmented ladders where the individual segments detach from one another, telescopic ladders are now widely available. One such example was disclosed by James and Richard Weston, U.S. Pat. No. 5,494,915, entitled "COLLAPSIBLE LADDER", issued Mar. 5, 1996. In this patent, the entire ladder is comprised of individual sections that collapse and nest within one another for storage and transport. Although useful for certain applications, the entire ladder remains a single unit; hence the weight cannot be distributed amongst multiple separate units. In addition, this type of design does not work well for bridges, since the segments that are meant for use at the top of the ladder are inherently smaller and weaker than those intended for use at the bottom of the ladder. This configuration may be acceptable for a ladder, since the stresses while in use will typically be much less at the top than at the bottom; however, in a bridge or scaffold configuration, the segments must be equally rigid across the entire length for sufficient structural rigidity. Commercially available telescopic ladders include the Telesteps® telescoping ladder, the Up Up® ladder (Core Distribution, Inc., Minneapolis, Minn.), and the Xtend & Climb® ladder (Core Distribution, Inc., Minneapolis, Minn.).

Carbon fiber has been used in a limited basis for ladder fabrication. GMT Composites (Bristol, R.I.) offers a folding carbon-fiber ladder for use on boats. Cima Ladder (www.cimaladder.com, Spain) has produced a 1-piece carbon-fiber ladder for light duty use. Neither of these ladders is designed for easy disassembly into individual segments. There is a need in the art for a portable, lightweight segmented ladder that is also strong enough to utilize as a horizontal walking surface.

SUMMARY OF THE INVENTION

A dual-use ladder and bridge modular system preferably includes tubes, gussets, flanges, and/or joints. In a preferred embodiment, the tubes, gussets, flanges, and/or joints are made of carbon fiber. A carbon fiber ladder segment includes a pair of tubular carbon fiber side rails, where each rail has a first end and a second end, at least one carbon fiber rung perpendicular to the carbon fiber side rails, where the carbon fiber rung connects the side rails of the ladder segment, and a joint connector located at least one of the first end and the second end of each carbon fiber side rail. The joint connector on an end of a first carbon fiber side rail of a first ladder segment mates with the joint connector on a second carbon fiber side rail of a second ladder segment. When at least two ladder segments are joined by the joint connectors, they form a structure.

A method of the present invention forms at least one carbon fiber ladder segment by permanently connecting a pair of carbon fiber side rails to at least one carbon fiber rung and adding a joint connector to at least one of the ends of each carbon fiber side rail.

The present invention also includes modular systems utilizing carbon fiber tubes. In one embodiment, the system includes a plurality of carbon fiber tubes having ends, and a joint connector located at least one of the ends of each carbon fiber tube. The modular system also preferably includes at least one modular element. The joint connectors mate with joint connectors on adjoining carbon fiber tubes or the modular elements to form a structure.

One preferred modular system is a modular ladder/bridge system which includes at least two ladder segments and at least one joint connector located at least one of the ends of each ladder segment. Each ladder segment includes a pair of carbon fiber side rails and at least one carbon fiber rung perpendicular to the carbon fiber side rails. The carbon fiber rung connects the carbon fiber side rails of the ladder segment. The joint connectors mate with joint connectors on adjoining carbon fiber side rails or the modular elements to form the structure.

Tube connectors of the present invention join a first tube and a second tube. Each tube has ends and an interior hollow portion. The tube connector includes a pair of male joint connectors having a first end connected to an interior surface of the first tube and a second end protruding from an end of the first tube, the second end of the male joint connector having at least one hole formed therein such that, when the second end of the male joint connector is inserted into an interior surface of the second tube, it is secured in place by insertion of pins through the second end of the male joint connector and mating holes in the second tube. In a preferred embodiment, the first tube and the second tube are made of carbon fiber.

BRIEF DESCRIPTION OF THE DRAWINGS

FIG. 39 shows a ladder/bridge including a flat walking surface added to the horizontal ladder segments.

DETAILED DESCRIPTION OF THE INVENTION

Figure 1:
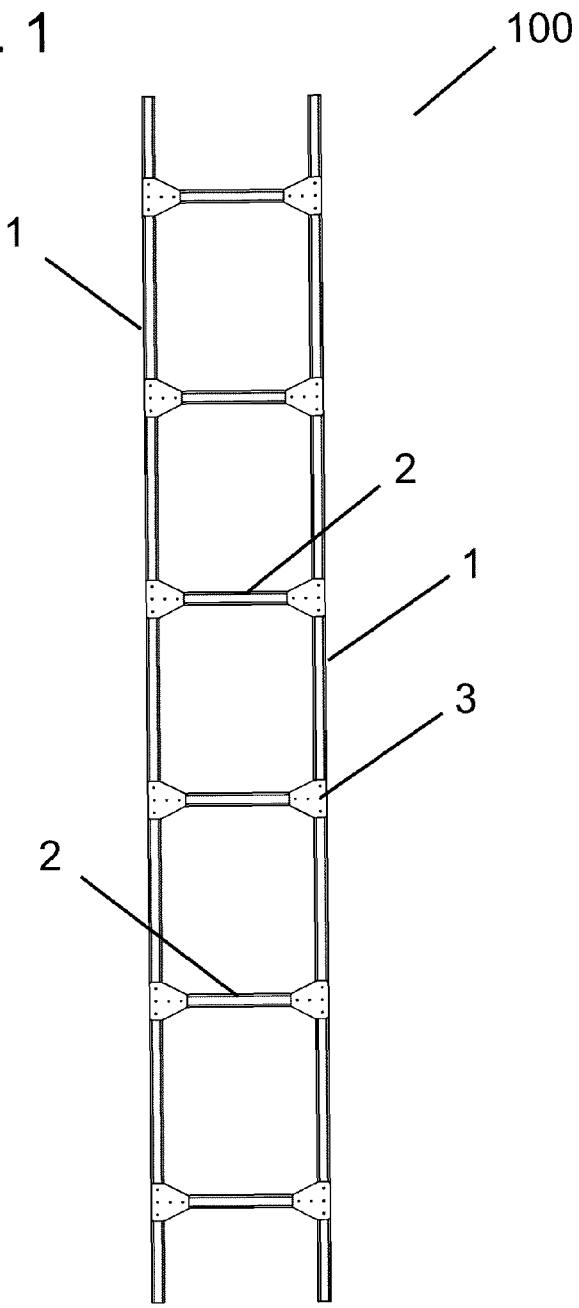
FIG. 1 shows an assembled 6-rung version of a carbon-fiber ladder/bridge with gusset plate construction in an embodiment of the present invention.

Carbon-fiber (CF) tubes and gusset plates can be used to create various structures, including trusses, bridges, supports for equipment, and many others. By fabricating a segmented ladder from carbon-fiber composites and metal or composite joints, the result is a unit that is both portable, as well as strong enough to utilize as a horizontal walking surface. The present invention includes a dual-use ladder and bridge structure preferably composed of carbon-fiber tubes, gussets, flanges, and/or joints. In particular, this design lends itself well to a segmented carbon-fiber ladder and bridge, but could be used for other designs as well. Within the framework of the design, the joint connectors (or splices) are an important component.

The present invention also includes a method for joining carbon-fiber tubes that is applicable where one needs the ability to both connect, as well as disconnect, the tubes. Another method creates a lightweight carbon-fiber beam with exceptionally high stiffness and strength using a combination of carbon-fiber braid material, uni-directional cloth, and pultruded carbon-fiber strips.

The structure includes modular construction of multiple pieces that are assembled into one or more ladders, bridges or other structures at the time of use, and then disassembled for storage or travel when the obstacle is cleared. The obstacles could include both vertical obstacles and horizontal obstacles. Some vertical obstacles include, but are not limited to, walls, trees, and rocks. Some horizontal obstacles include, but are not limited to, moving from rooftop to rooftop, moving from window to window, or crossing a river.

In a preferred embodiment, the carbon-fiber structures of the present invention are composed of a combination of carbon fiber tubes, carbon fiber gussets, carbon fiber flanges, and/or carbon fiber splices. Some uses for this carbon fiber assembly include a climbing ladder, when an individual needs to scale an obstacle vertically, and a bridge, when an individual needs to cross an obstacle horizontally.

The modular devices of the present invention, which preferably include multiple identical segments, can be built and used as a ladder, a bridge, or any other segmented structure, including, but not limited to, a scaffold or truss structure. While the structure preferably includes pieces made of carbon fiber, the modular ladder/bridge system of the present invention could alternatively be manufactured out of other lightweight materials, such as fiberglass, aluminum, or titanium, or any combination of these and other materials. The obstacles could include both vertical obstacles and horizontal obstacles. A ladder, as defined herein, is a structure that includes steps which include two parallel members connected by rungs. A bridge, as defined herein, is any structure that spans and provides passage over a gap, barrier, or other obstacle, thus allowing people, animals, vehicles or other objects to bypass the obstacle. These two terms will be used interchangeably herein.

An embodiment of the present invention is shown in FIG. 1, which depicts an assembled segmented ladder/bridge structure 100. The ladder/bridge 100 includes main support beams, which are preferably tubes 1, and perpendicular rungs 2 that act as hand and foot supports. The main support tubes are permanently connected to the rungs 2. In a preferred embodiment, the main support tubes 1 and the perpendicular rungs 2 are made of carbon fiber. The rungs are preferably permanently connected by bonding them with an adhesive to the side support tubes with gussets 3. Bonding, as used herein, is the use of an adhesive layer placed at the mating surfaces between two components that results in a permanent connection. In a preferred embodiment, the gussets 3 are made of carbon fiber. A precision fixture is used to hold the assembly in the correct position during fabrication while the adhesive cures.

FIG. 1 shows a six-rung version of the structure 100. However, a structure 100 with any alternative number of rungs 2 and segments could be manufactured, depending upon the intended use of the structure 100. The rungs 2 are preferably evenly spaced when the structure 100 is assembled.

Figure 2:
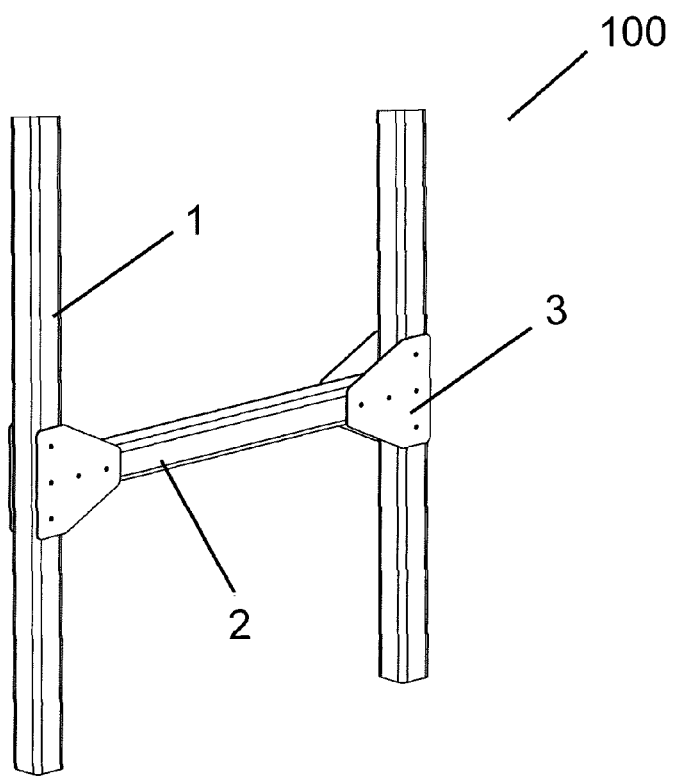
FIG. 2 shows a close-up view of the gusset plate and rung construction shown in FIG. 1.

FIG. 2 shows a close-up view of an example of carbon fiber gusset plate construction. In this example, 1-inch square carbon fiber tubes are used for both the tubes 1 and the rungs 2 in the entire structure. However, other sizes for the carbon fiber tubes, including, but not limited to, 0.75 inch square and 2 inch square, as well as other shapes for the carbon fiber tubes, including, but not limited to, carbon fiber tubes that are round, rectangular, or rectangular with rounded ends, in cross-section, could alternatively be used. In addition, the carbon fiber tubes may be braided carbon fiber tubes. Preferred materials in the embodiments where carbon fiber tubes are used in the ladder/bridge are DragonPlate™ Engineered Carbon Fiber Composites (Allred & Associates Inc., Elbridge, N.Y.). In other embodiments, the segments of the ladder in the modular system may be made of other lightweight materials, or a combination of materials.

Figure 3:
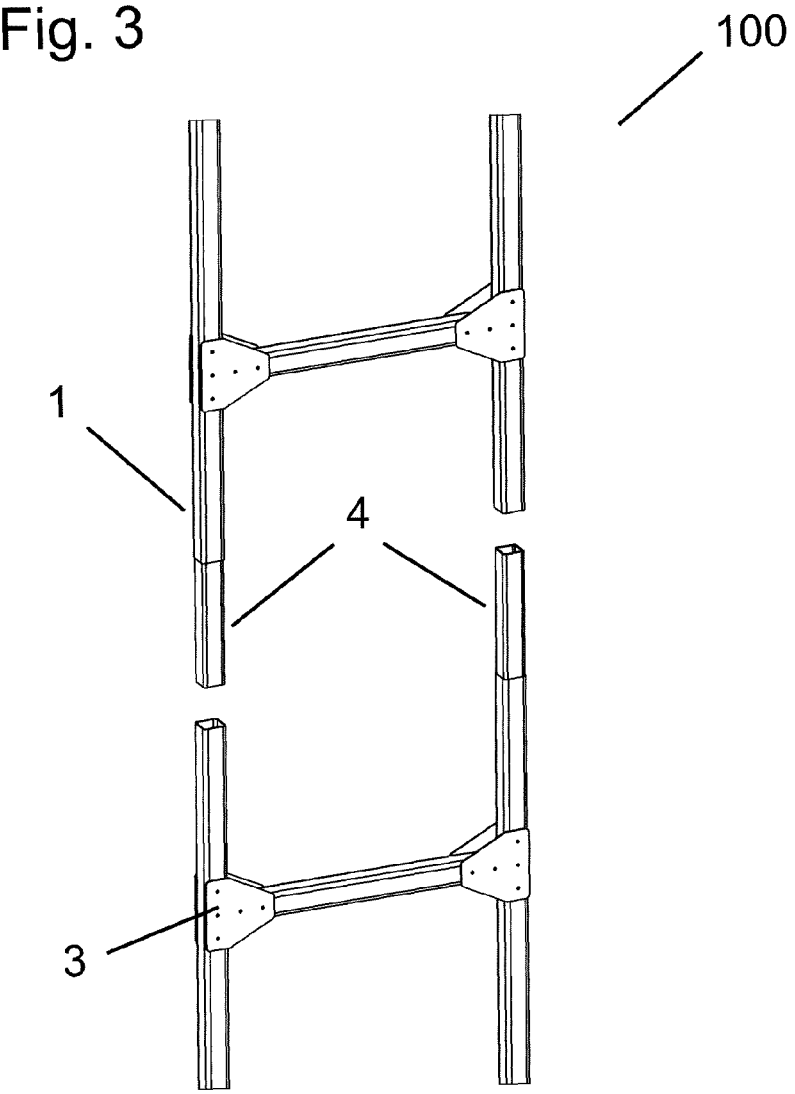
FIG. 3 shows the splice joint, rung, and flange construction of the ladder/bridge shown in FIG. 1.

FIG. 3 shows the ladder/bridge 100 pulled apart, to show splice joint, rung, and flange construction of the ladder/bridge 100. Splice connections 4 are shown in FIG. 3. The splices 4 slide into the outer tubes 1 and are bonded into place. In this case, a splice 4 is bonded approximately half-way into one of the support tubes. Opposite splices 4 are lined up with the mating tubes 1 and pressed together at the time of use. A pin, clip, or other fastener can optionally be used to guarantee the splice 4 does not come apart during use.

Figure 4:
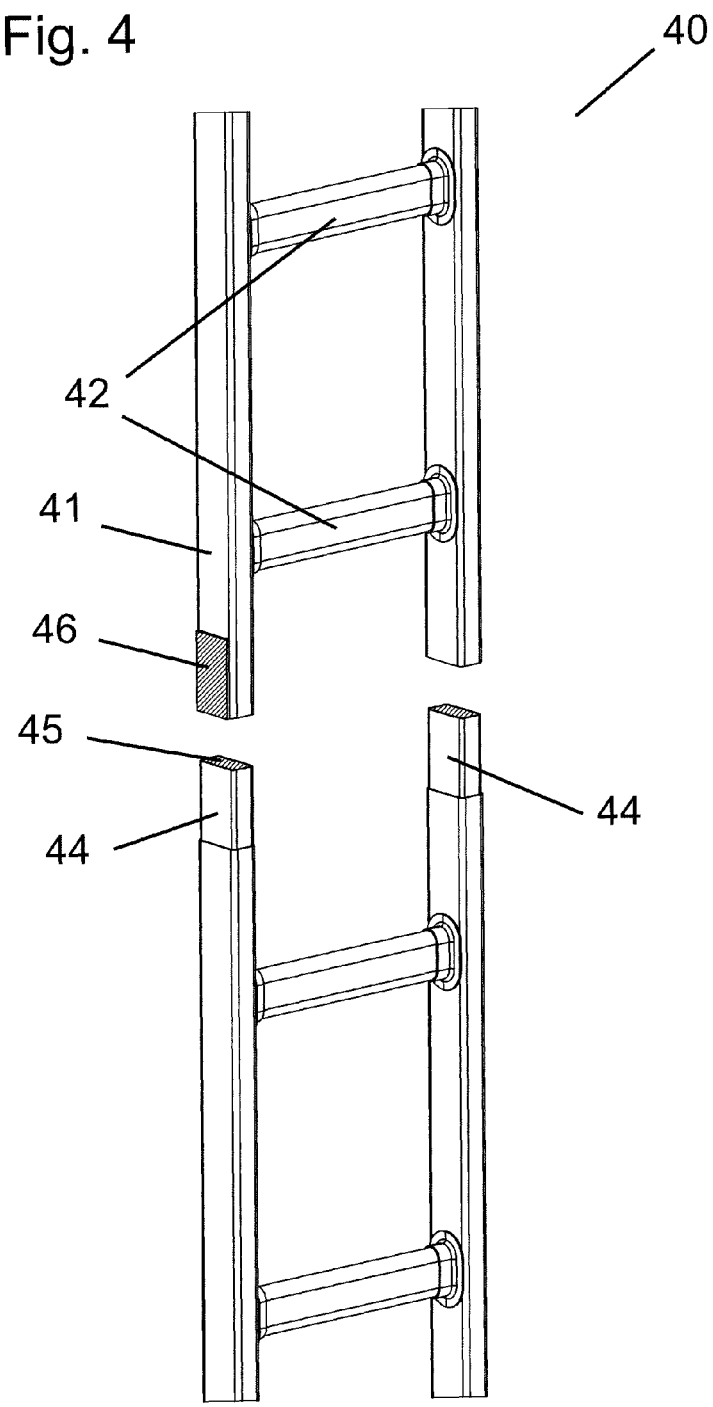
FIG. 4 shows another embodiment of a ladder/bridge with a splice joint that includes a reinforcement plate and splice core.

Often, added structural stiffness is necessary, for example for greater weight loads or if the ladder is longer. FIG. 4 shows an alternative construction for the structure 40, which is preferably constructed as a ladder or a bridge. In this figure, instead of the square side supports 1, the tubes 41 are now preferably rectangular. By doing this, the stiffness of the main supports is greatly increased without substantially increasing the weight. In a preferred embodiment, the tubes 41 are carbon fiber tubes. In embodiments where carbon fiber tubes are used, any usable size for the carbon fiber tubes 41 (as well as the rungs 42), including, but not limited to, 0.75 inch square, 1 inch square, and 2 inch square, as well as other shapes for the carbon fiber tubes, including, but not limited to, carbon fiber tubes that are square, round, or rectangular with rounded ends, in cross-section, could alternatively be used. In addition, the carbon fiber tubes may be braided carbon fiber tubes. Preferred materials for the carbon fiber tubes and other components of the ladder/bridge are DragonPlate™ Engineered Carbon Fiber Composites (Allred & Associates Inc., Elbridge, N.Y.).

In addition, a core material 45, typically foam, is preferably added inside the splice joint 44 to increase rigidity and damage tolerance. The core 45 could alternatively be made of any lightweight material able to increase the structural stiffness of the ladder/bridge 40, including, but not limited to, a lightweight wood, for example balsa wood. The core material 45 may also optionally be included in the tubes 41, and/or the rungs 42, to further increase stability.

FIG. 4 also shows the rungs 42, which are preferably a rectangular shape with rounded ends, although they could alternatively be other shapes including, but not limited to, square, round, or rectangular. Reinforcement plates 46 may optionally be added on the side beams 41 on the side opposite the internal splice 44 for additional strength. Note that the core material 45 and/or the reinforcement plates 46 may alternatively be included in the ladder/bridge 100 shown in FIGS. 1-3. For example, the core material 45 may be incorporated inside any or all of the main support tubes 1, the rungs 2, and or the splice connections 4 of the ladder/bridge 100 shown in FIGS. 1-3.

Figure 5:
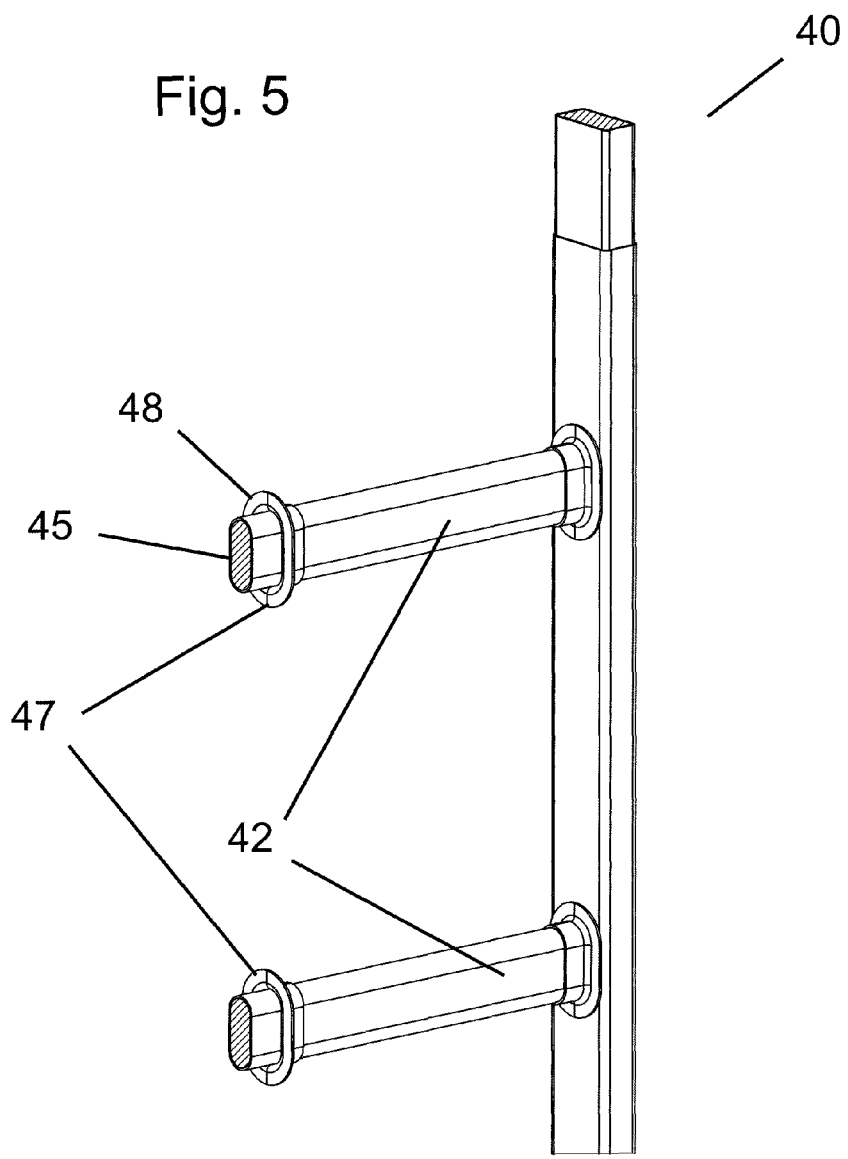
FIG. 5 shows a close-up of the rung and side-rail assembly of the ladder/bridge of FIG. 4.

FIG. 5 shows two rungs 42 of the ladder/bridge 40 with one side-rail hidden. The rungs 42 in this embodiment may include a core material 45. A portion 48 of the rungs 42 carries through the inside surface of the side support tubes 41 and is bonded to the interior of the opposite face. This ties the entire assembly together and prevents the rungs 42 from shearing off. To further increase bonding surface area and strength, flanges 47 are preferably fabricated to match the contour of the rungs 42. In preferred embodiments, the flanges 47 are carbon fiber flanges. The structure 40 is assembled by first sliding the rung 42 through the left side support 41, then sliding on the flanges 47, and finally attaching the right side support tube 41.

Figure 6:
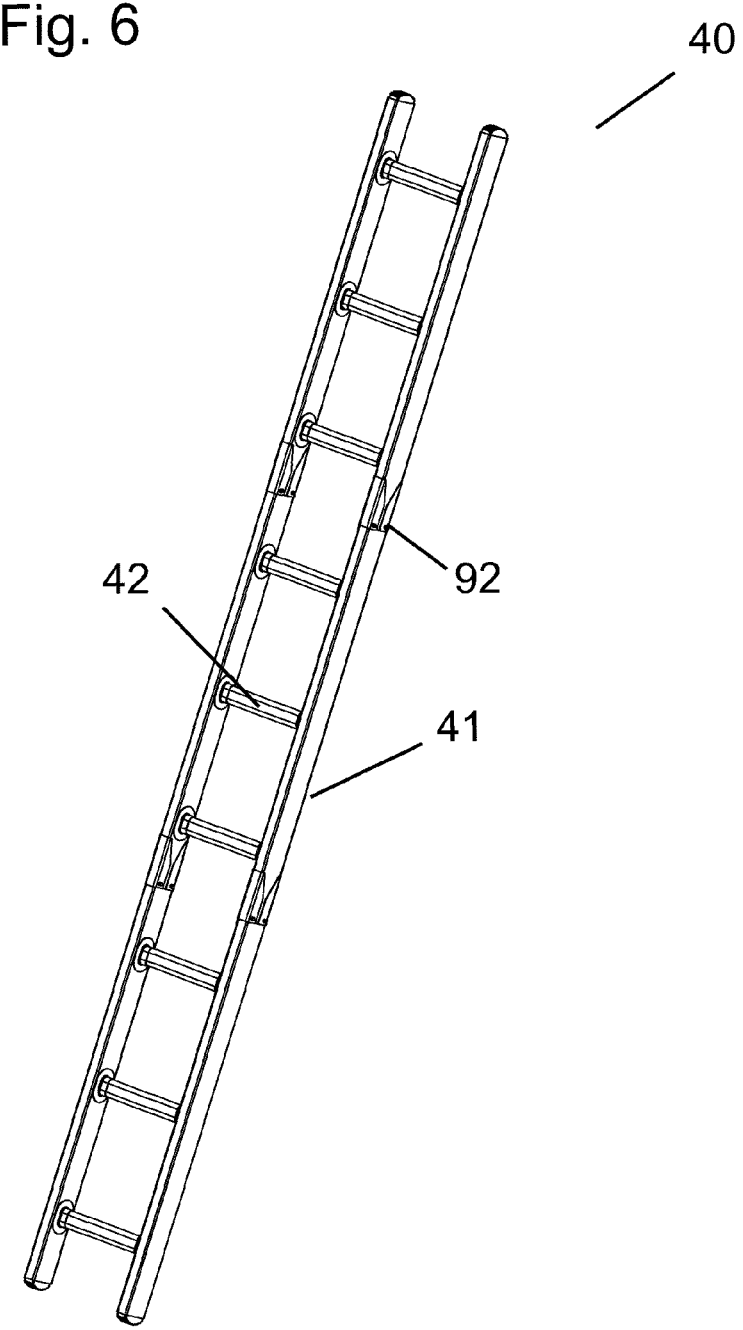
FIG. 6 shows a three-section ladder configuration with internal joint connectors and external reinforcement brackets in an embodiment of the present invention.
Figure 7:
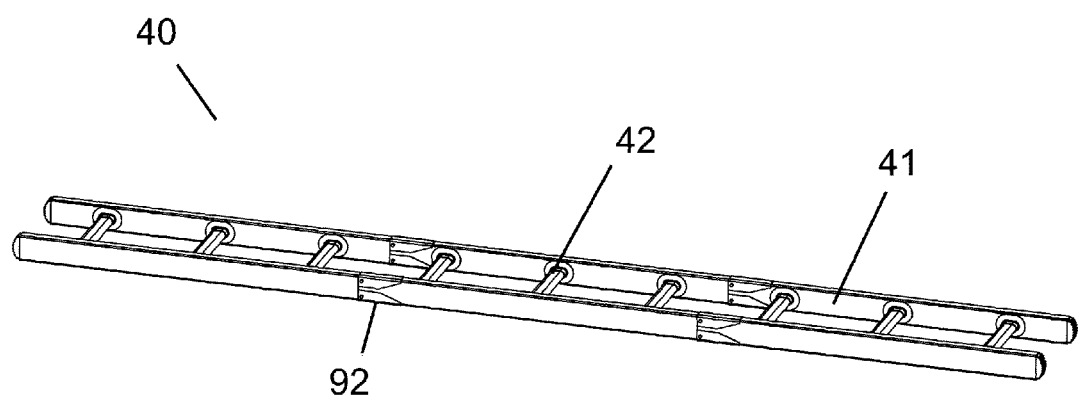
FIG. 7 shows the three-section configuration of FIG. 6 in a horizontal position for use as a bridge.

An assembled three-section structure 40 is shown in FIG. 6 in a vertical ladder use configuration, and in FIG. 7 in a horizontal bridge use configuration.

The structures of the present invention are particularly useful because of the segmentation of the components. The entire modular structure is composed of smaller pieces, each one a separate ladder/bridge section (also described as a ladder segment herein), which are put together at the time of use. While the structure includes pieces made of carbon fiber in some preferred embodiments, the modular ladder/bridge system of the present invention could alternatively be manufactured out of other lightweight materials, such as fiberglass, aluminum, or titanium, or any combination of these and other materials. The individual pieces, or any combination of them, may be used as a ladder, a bridge, or another structure. For ease of fabrication and assembly, all components can be made identical. For assemblies with greater than two sections, the only difference is elimination of the splices at the terminal ends.

One example of a ladder/bridge of the present invention is a five-section, 32-foot ladder weighing approximately 35 pounds. For scaling vertical obstacles, the user can choose to use 1, 2, 3, 4, or all 5 sections, depending on the height of the obstacle. This unit could also be used as two or more smaller ladders simultaneously by multiple individuals. The individual sections could then be used either alone or with any combination of other sections, and be placed horizontally across a gap, for example between buildings or over a small ravine or canal. Once all users are safely across, the bridge can be pulled up by a single individual due to its light weight carbon-fiber tubular construction.

Figure 8:
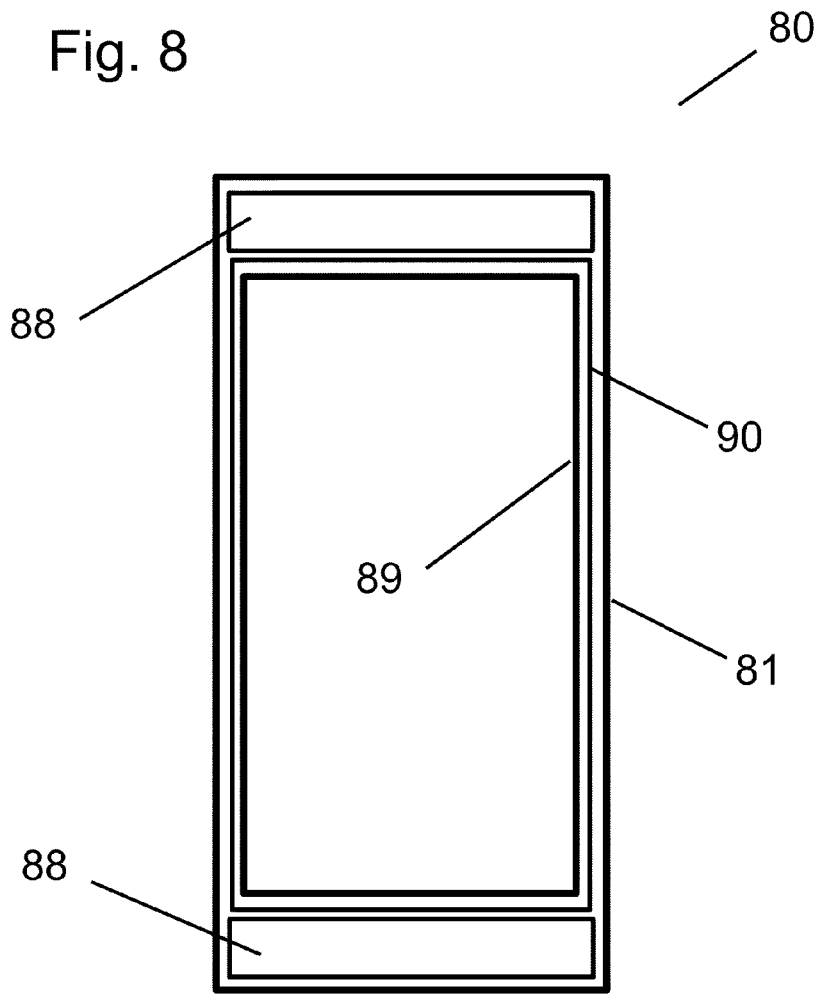
FIG. 8 shows a schematic of a carbon-fiber tube with embedded uni-directional and pultruded carbon fibers.

A novel method fabricates the main support beams 80, shown in FIG. 8. Pultruded carbon-fiber strips 88 are placed within carbon-fiber tubes to add significant tensile and bending strength. In a preferred embodiment, the pultruded carbon-fiber strips 88 are preferably approximately rectangular in shape, although other shapes are also possible. The strips 88 are placed within the composite layup and sandwiched between layers 81, 89, and 90 of carbon-fiber woven material. In a preferred embodiment, a layer of braided or plain-weave material is used for the inside surface 89 (inner carbon fiber layer) of the tube 80, followed by layers of uni-direction carbon-fiber fabric 90 (uni-directional carbon fiber), and then a layer of braided material for the outside layer 81 (outer carbon fiber layer) of the tube 80. Pultruded carbon fiber strips 88 are preferably placed between the braided carbon fiber layers 90 and 81 (or, in the embodiments where there is no uni-directional carbon-fiber fabric layer 90, between the braided carbon fiber layers 89 and 81) and held in place once the adhesive cures. In one embodiment, the adhesive is epoxy, but any adhesives that could be applied to carbon fiber tubes and efficiently adhere the layers could alternatively be used.

In applications where bending strength is needed about a single axis (for example, bending of the carbon-fiber ladder/bridge), pultruded carbon fiber strips 88 can be placed along only the top and bottom beam surfaces, but excluded from the sides. In some preferred embodiments, the uni-direction carbon-fiber fabric 90 wrapped around the inner carbon-fiber layer 89 is excluded, leaving only the outer 81 and inner carbon-fiber material 89 and the pultruded carbon-fiber strips 88. During fabrication, the pultruded carbon-fiber strip 88 may be one solid piece on each side, or composed of two or more pieces for ease of fabrication. Also, by stacking the strips 88 on top of one another, additional wall thickness can be easily accomplished, resulting in higher beam stiffness and strength. This method of construction results in a lightweight beam with exceptionally high stiffness and strength along a single bending axis.

Figure 9:
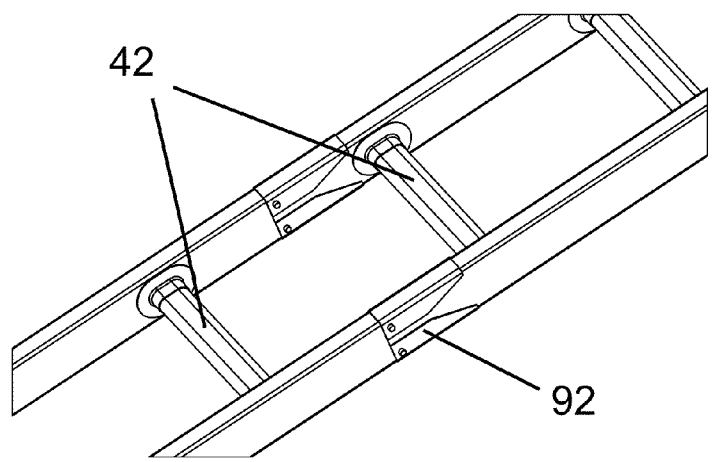
FIG. 9 shows a close-up schematic of a ladder design, including rungs, gussets and a joint.
Figure 10:
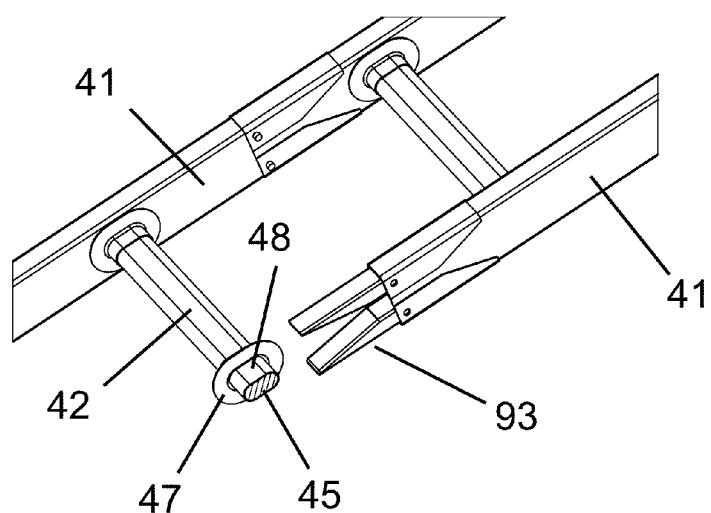
FIG. 10 shows a joint location with a side beam removed to expose the internal connectors.
Figure 11:
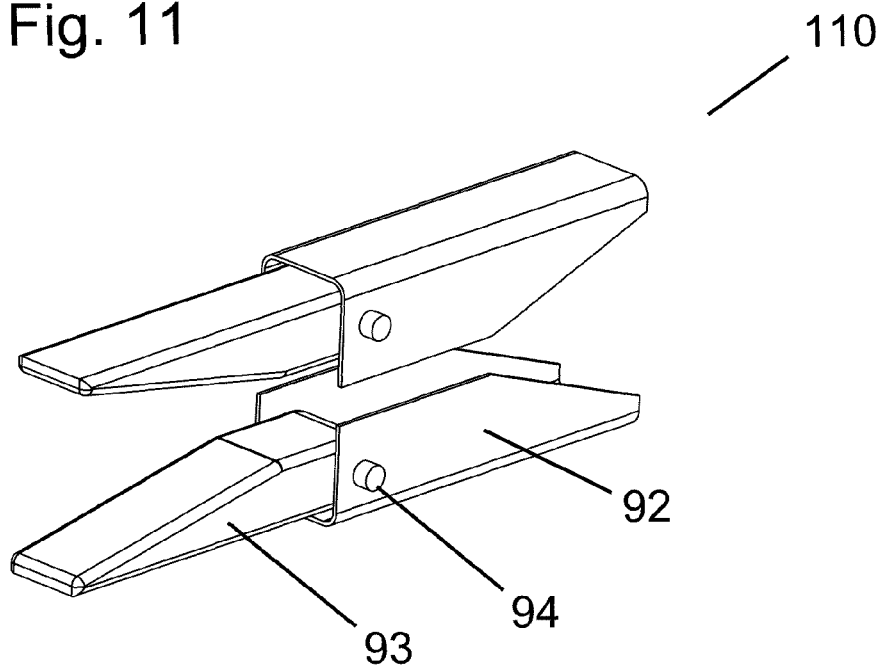
FIG. 11 shows a basic joint assembly with the side beams hidden.
Figure 12:
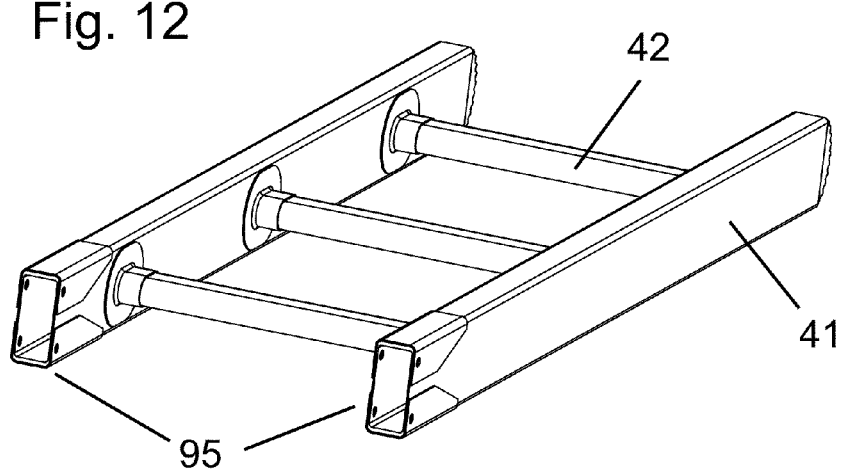
FIG. 12 shows a female joint connection end of a ladder section.
Figure 13:
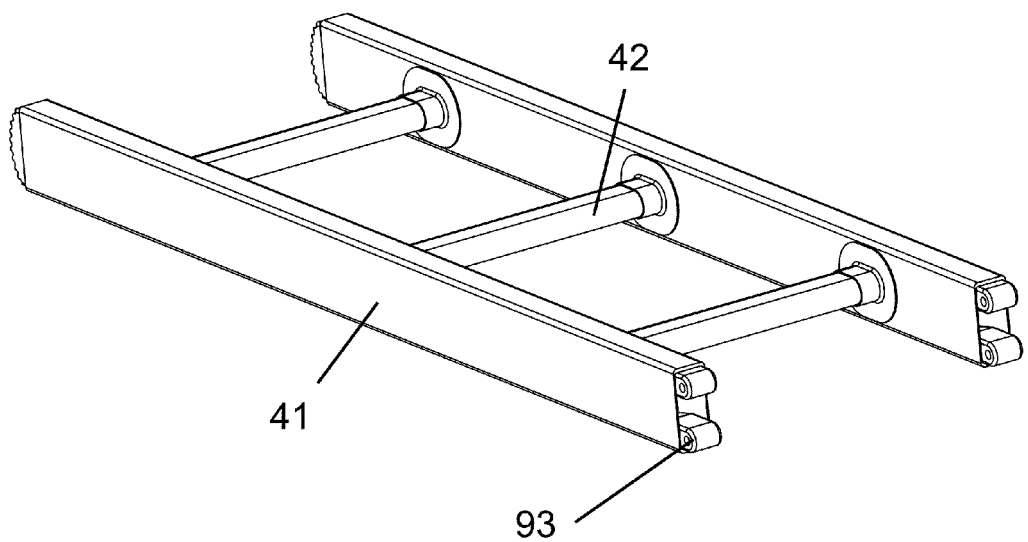
FIG. 13 shows a male joint connection end of a ladder section.

FIG. 9 shows a close-up near a joint of a ladder/bridge 40, depicting the rungs 42 and reinforcement gussets 92. FIG. 10 shows a portion of the ladder/bridge 40 with one side-wall tube made transparent, revealing the internal joint connectors 93 bonded within the side-beam tube 41. The joint connectors 93 are preferably made of fiberglass, but they could alternatively be made of other lightweight, strong materials, including, but not limited to, aluminum or titanium. FIG. 11 shows a basic assembly of this type of joint 110. The gussets 92 are placed on the opposite (female) side of the joint for added wall strength. Pins 94 are inserted to hold the joined components together when in use. The complete female ladder segment connection 95 is shown in FIG. 12. FIG. 13 shows the mating male segment side 93. The individual ladder/bridge segments are assembled by sliding the internal joint connectors 93 into the mating end 95 of the adjoining segment, lining up the joint connector holes, and inserting two pins 94.

Figure 14:
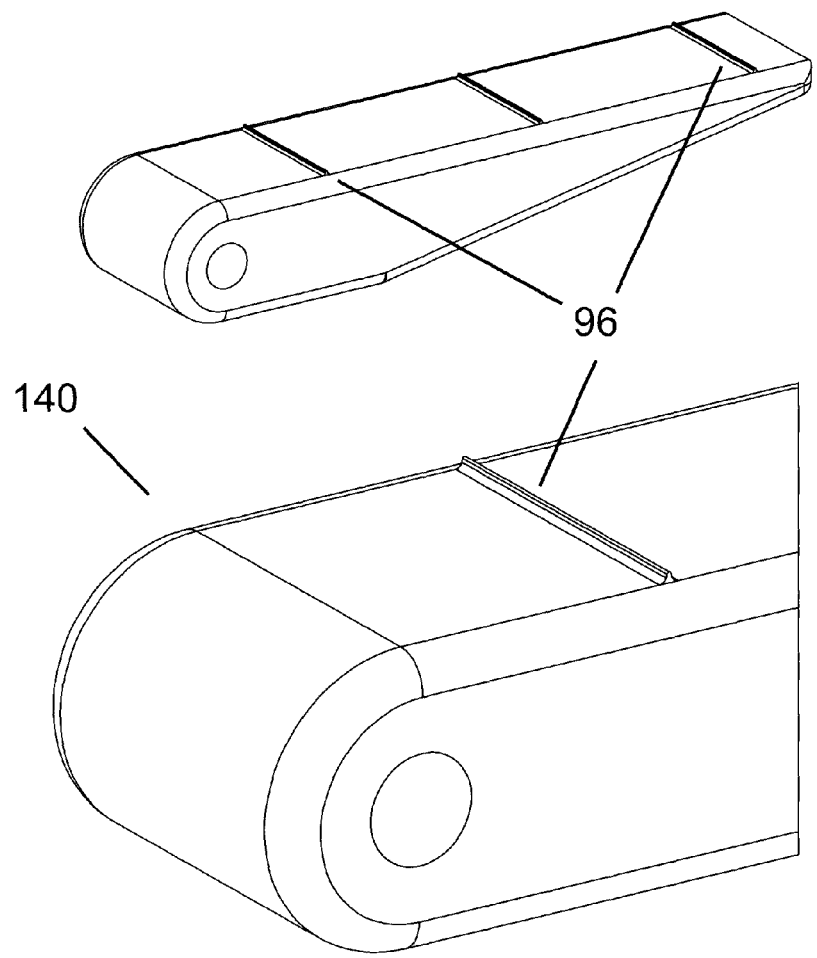
FIG. 14 shows an internal joint connector with adhesive ridge gauges.

An alternative internal joint connector 140 with ridge guides 96 is shown in FIG. 14. The ridge guides 96 are preferably fabricated as part of the internal joint connector 140. This joint connector 140 would replace the male segment side 93 of the joint connector 110 shown in FIG. 11. The joint connector 140 allows proper spacing of the internal connector piece away from the tube inner wall to maintain sufficient adhesive thickness. In one embodiment, the joint connector 140 is preferably made of fiberglass. Alternatively, the joint connector 140 may be made from any other lightweight, strong material including, but not limited to, aluminum or titanium.

Figure 15:
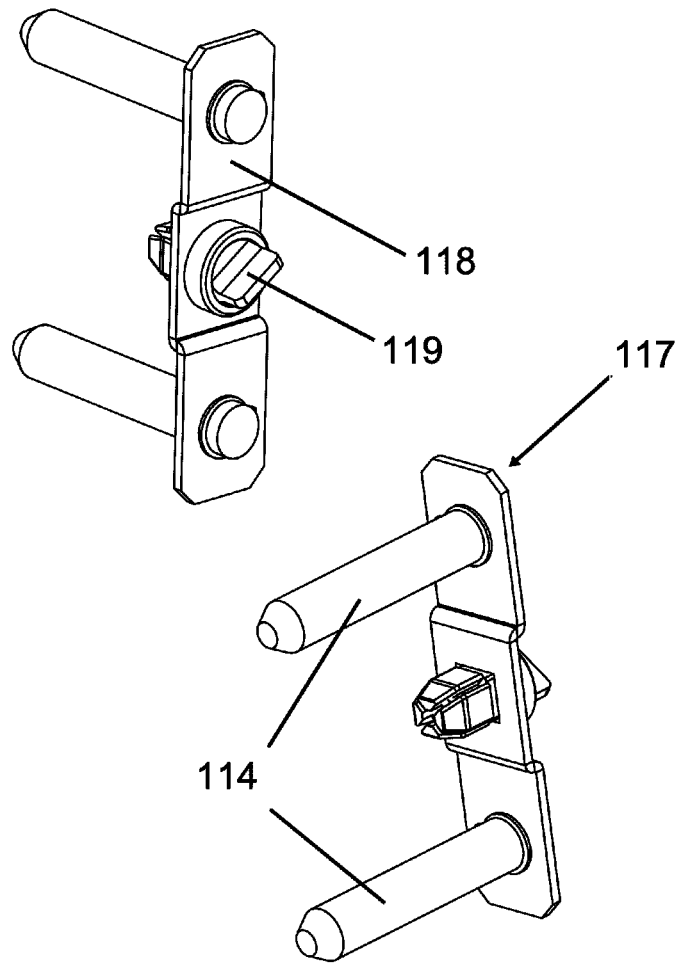
FIG. 15 shows a double pin assembly.
Figure 16:
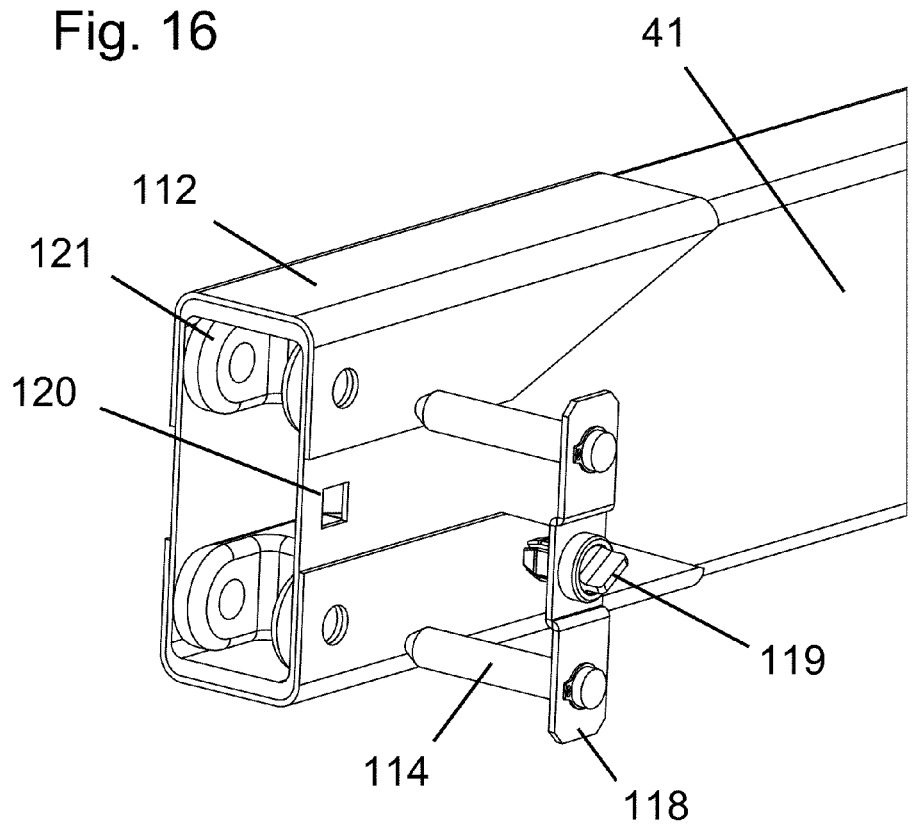
FIG. 16 shows the double pin assembly of FIG. 15 before insertion.

One embodiment of a pin joint connector is a dual-pin connector 117, as shown in FIG. 15. This design includes two pins 114 rigidly connected to a metal or composite bracket 118. In the center of the connector is a fastener 119, which engages with a hole 120 in the side of the outer surface of the main ladder beam 41, as shown in FIG. 16. In a preferred embodiment, the fastener 119 is a Zeus-type turn fastener. When the fastener 119 is fully engaged and turned, the pin connector 117 locks in place to prevent the ladder segments from sliding apart.

An alternative female internal connector 121 is also shown in FIG. 16. The outer reinforcement bracket 112 can optionally be used here; however, the primary load path now goes through the female internal connector 121.

Figure 17:
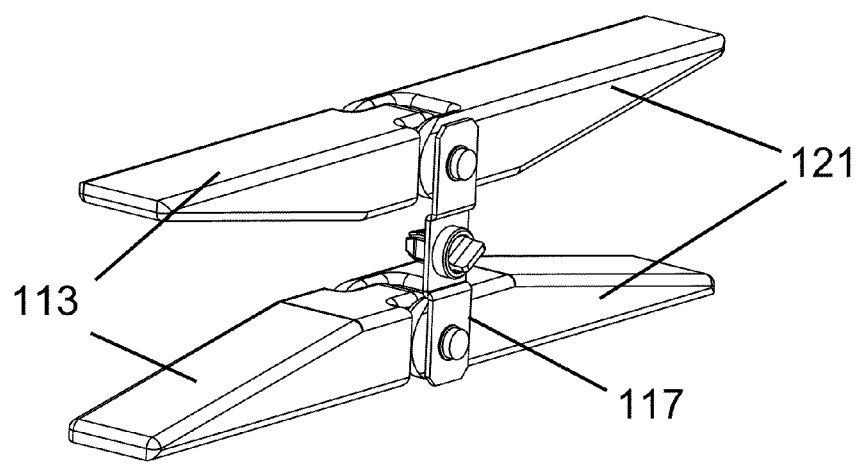
FIG. 17 shows a double pin assembly inserted into internal joint connectors.

Insertion and final placement of the two-pin connector 117 in the assembly is shown in FIG. 17. Here, the side-beams are hidden to show only the male and female internal connectors 113 and 121, and the dual-pin connector 117. When the structure is disassembled, the pin connector 117 can be stored in place in the segment holes, or retained by a tie or line affixed to the structure.

Figure 18:
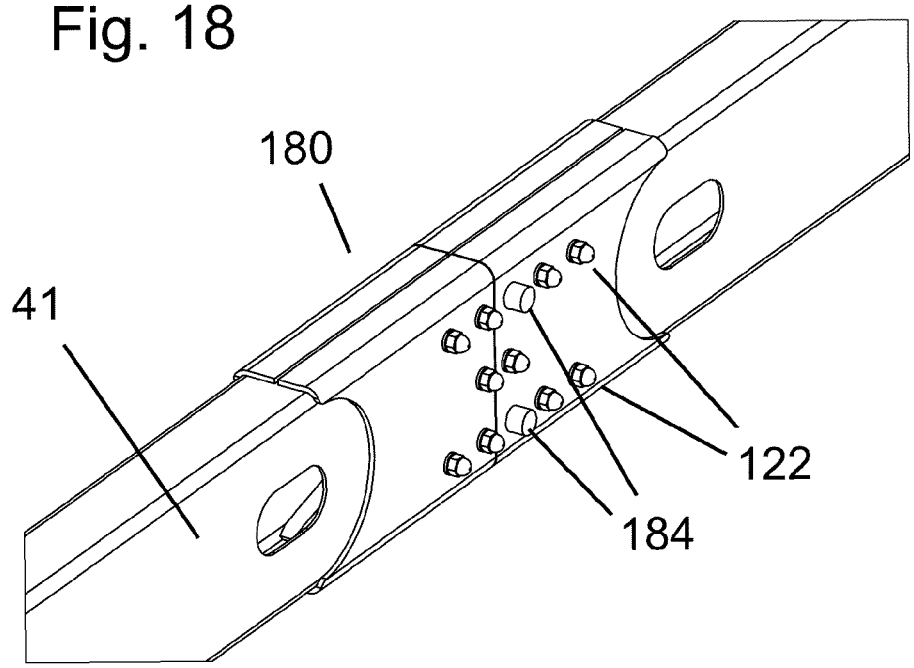
FIG. 18 shows an alternative joint arrangement.
Figure 19:
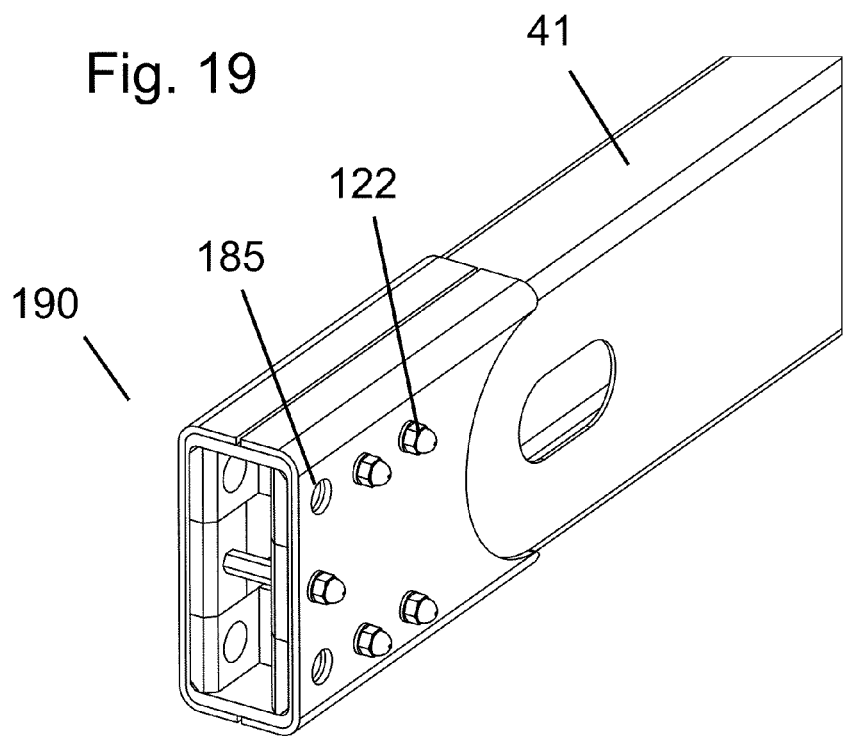
FIG. 19 shows the female joint connection of FIG. 18 with multiple flat plates.
Figure 20:
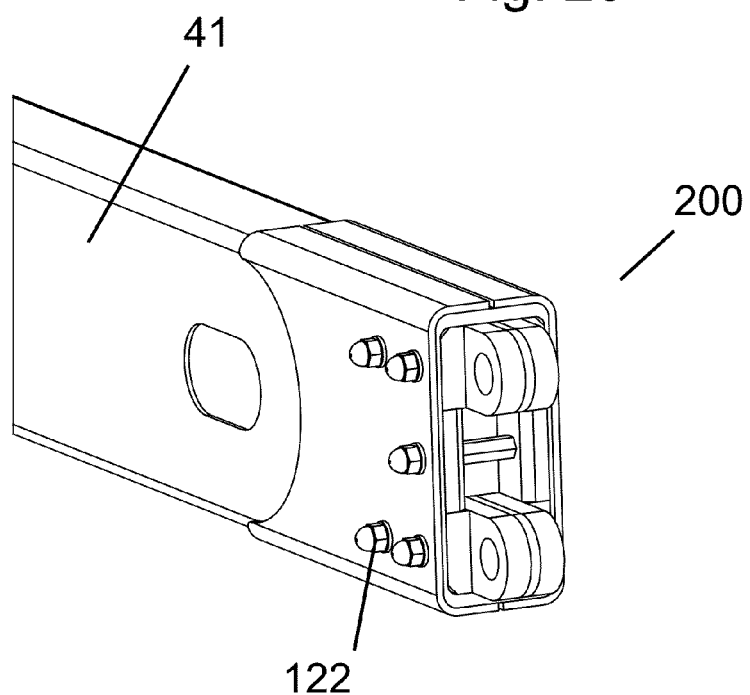
FIG. 20 shows the male joint connection of FIG. 18 with multiple flat plates.
Figure 21:
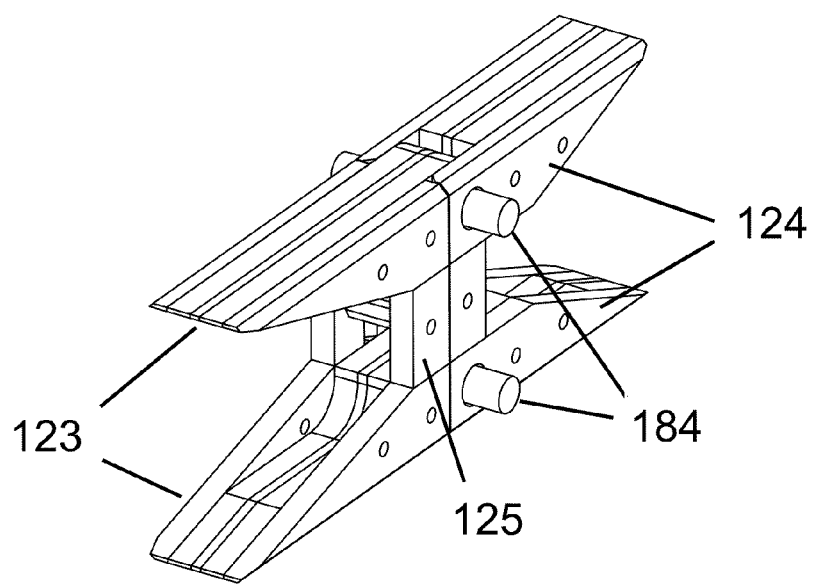
FIG. 21 shows a joint connection with multiple flat plate construction with the beams hidden.
Figure 22:
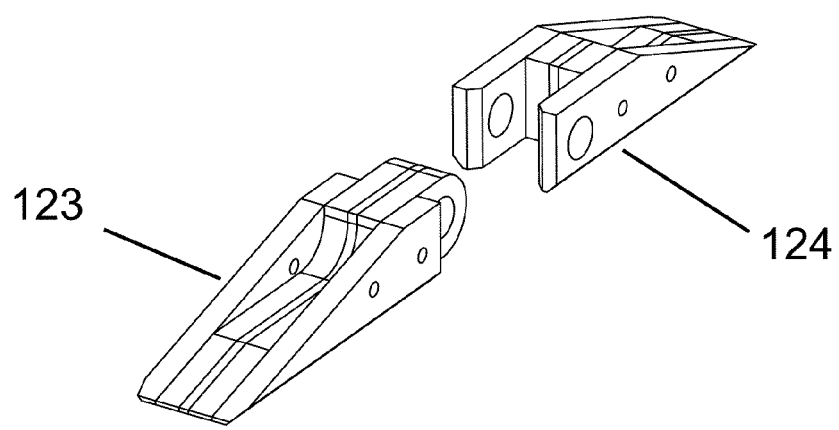
FIG. 22 shows an individual male and female connector of the connection of FIG. 21 with multiple flat plate construction.

FIGS. 18 through 22 show an alternative embodiment of internal joint connectors. FIG. 18 shows the complete joint 180. Here, additional mounting hardware (for example, bolts, washers, and/or nuts) 122 are permanently mounted to each side beam 41 through the internal joint connectors for added safety. Pins 184 make the connection through holes 185 between the two joining segments. FIG. 19 shows the female segment end 190 for the joint connector 180 and FIG. 20 shows the male segment end 200. The male 123 and female 124 internal joint connectors are preferably fabricated from multiple machined flat plates, as shown in FIG. 21. By using a flat-plate construction, volume machining costs are reduced. In between the male 123 and female 124 internal connectors are shear support pieces 125. These pieces act as the web of an I-beam, reducing the shear stresses in the side-walls of the carbon fiber tubes 41. FIG. 22 shows a single male internal connector 123 and a single female internal connector 124 before the connection is made.

Figure 23:
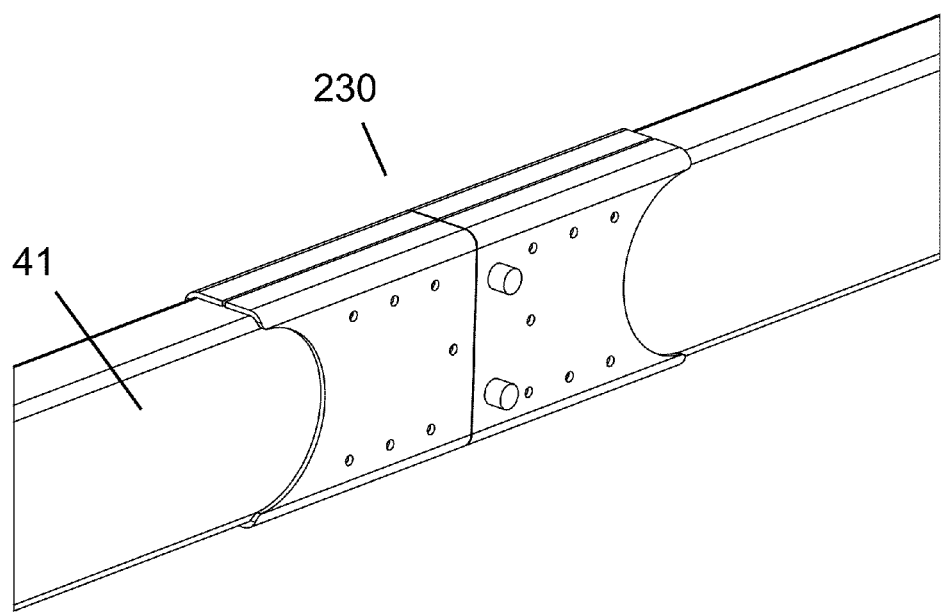
FIG. 23 shows another alternative joint connection.
Figure 24:
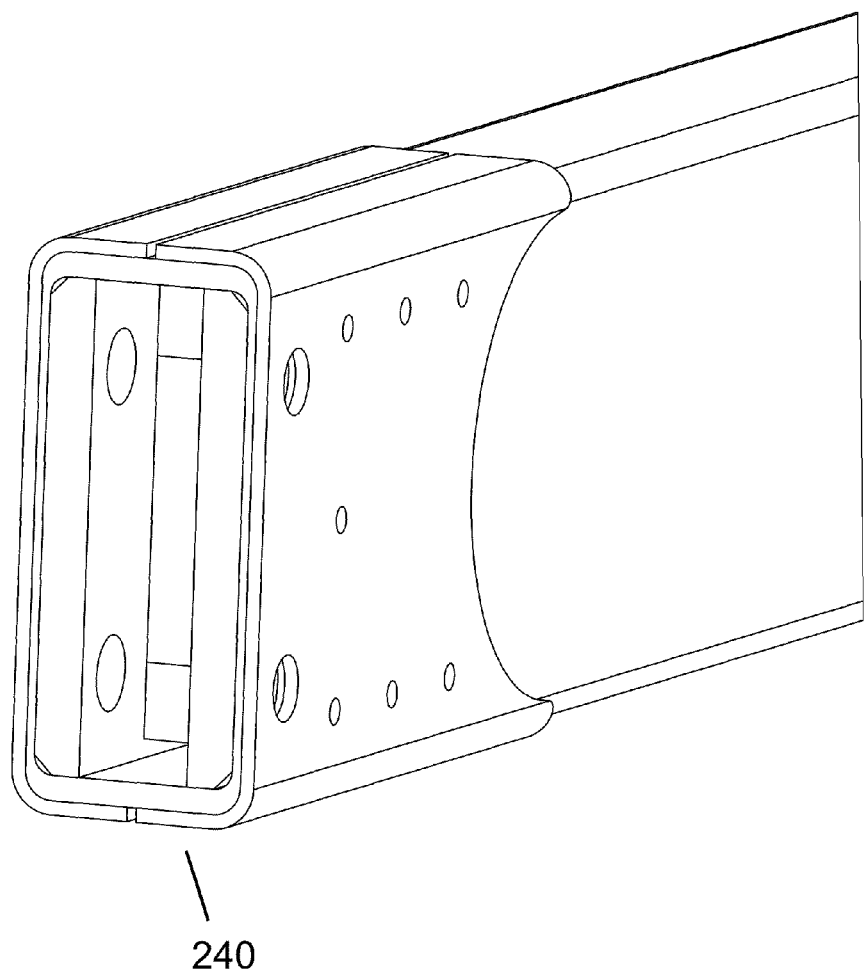
FIG. 24 shows a female connection end of the joint connection shown in FIG. 23.
Figure 25:
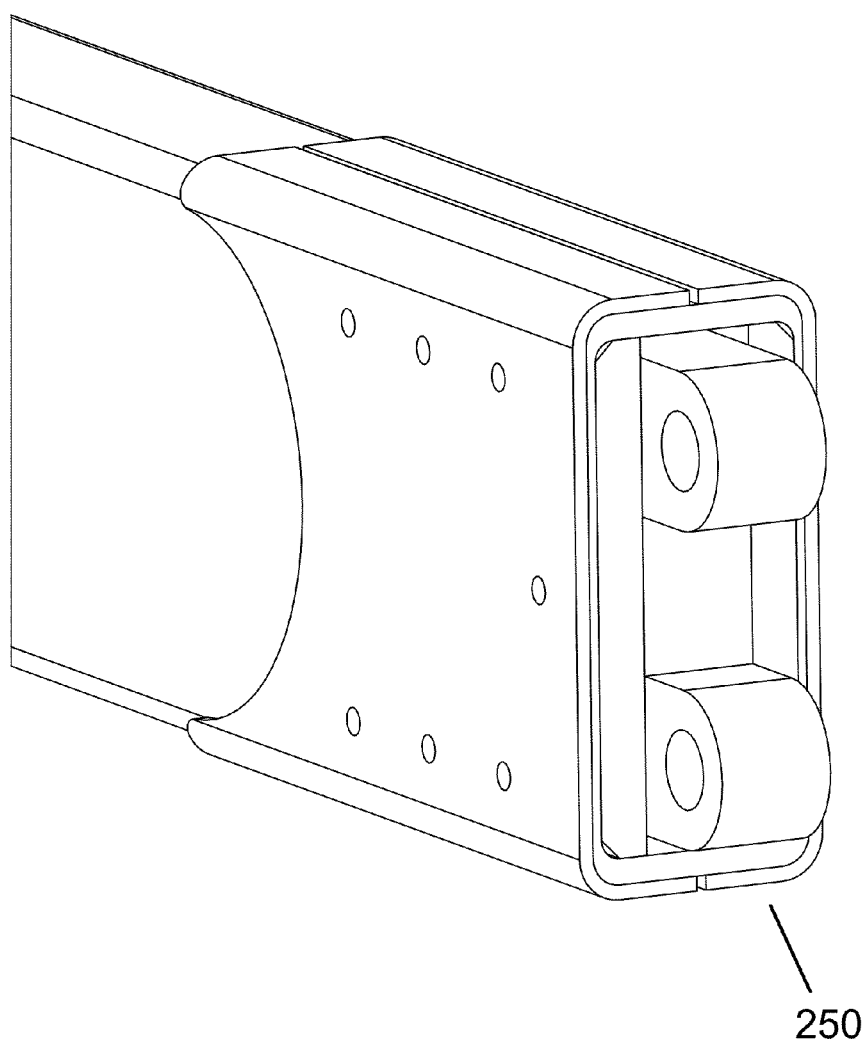
FIG. 25 shows a male connection end of the joint connection shown in FIG. 23.
Figure 26:
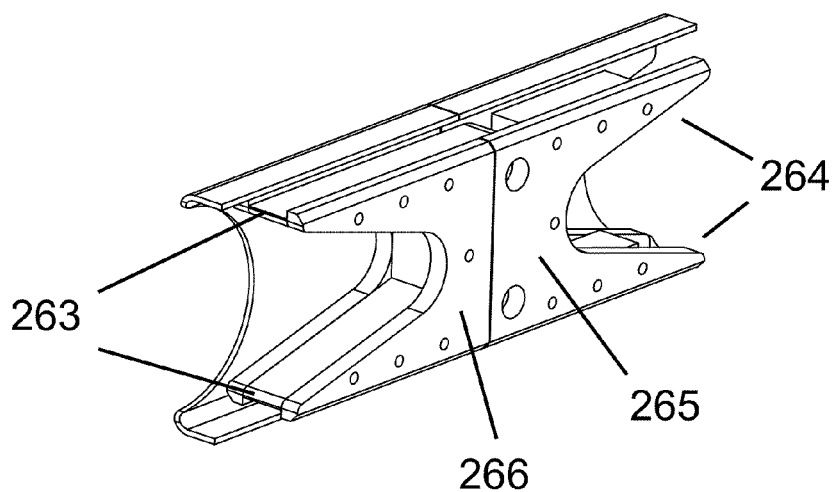
FIG. 26 shows the internal joint connectors of the joint connection shown in FIG. 23 with the beams hidden.
Figure 27:
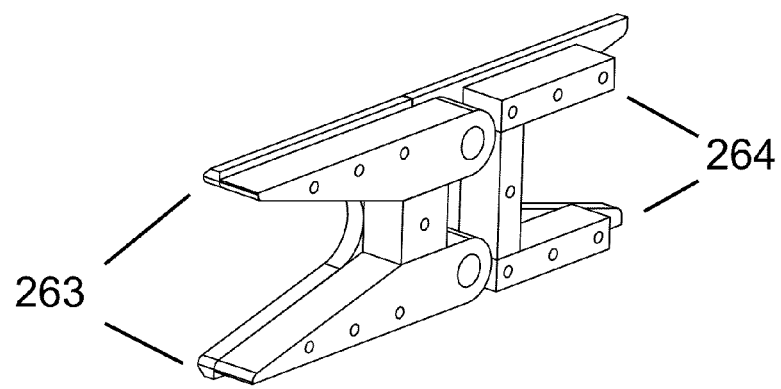
FIG. 27 shows the internal joint connectors of FIG. 26 with the brackets and the front plates hidden.

FIGS. 23 through 27 show another embodiment for the internal joint connectors. FIG. 23 shows the complete joint 230. FIGS. 24 and 25 show the female 240 and male 250 connector ends, respectively. FIG. 26 shows the male 263 and female 264 internal joint connectors connected to each other. FIG. 27 shows a male internal connector 263 and a female internal connector 264 with brackets (which are made of carbon-fiber in a preferred embodiment) and front components hidden. In this embodiment, the joints are again made up of flat-plate machined components. Unlike the design shown in FIG. 21, however, where the shear web 125 is a separate piece, the flat components 265 and 266 on the outer walls in this embodiment include the top and bottom components, as well as the shear web. This reduces the number of machined parts.

While the joint connectors 93, 140, 117, 180, 230 discussed herein are preferably used in the modular ladder/bridge system of the present invention, any of the joint connectors 93, 140, 117, 180, 230 could alternatively be used in any structure or modular system that required connections between two separate pieces with interior portions, for example a beam including but not limited to, a rail, an I-beam, or a tube. In one preferred embodiment, the joint connectors connect two tubes with interior hollow portions or more specifically, two composite tubes. More preferably, the tubes are carbon fiber tubes. A tube, as defined herein, is a long hollow object. As an example, any of the joint connectors could be used to connect pieces of a truss structure.

Figure 28:
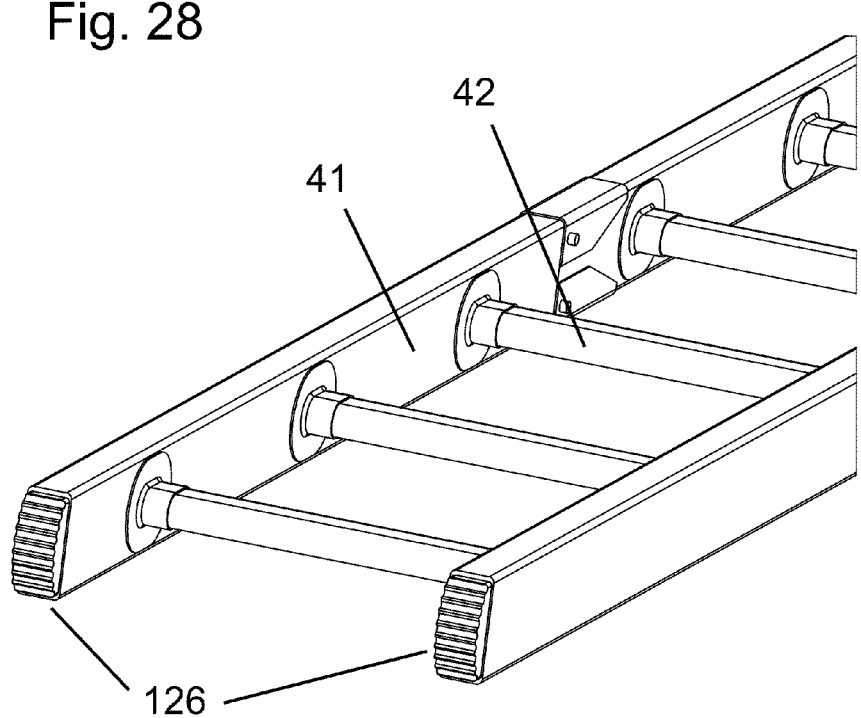
FIG. 28 shows permanently mounted feet bonded into the terminal end of a ladder segment.
Figure 29:
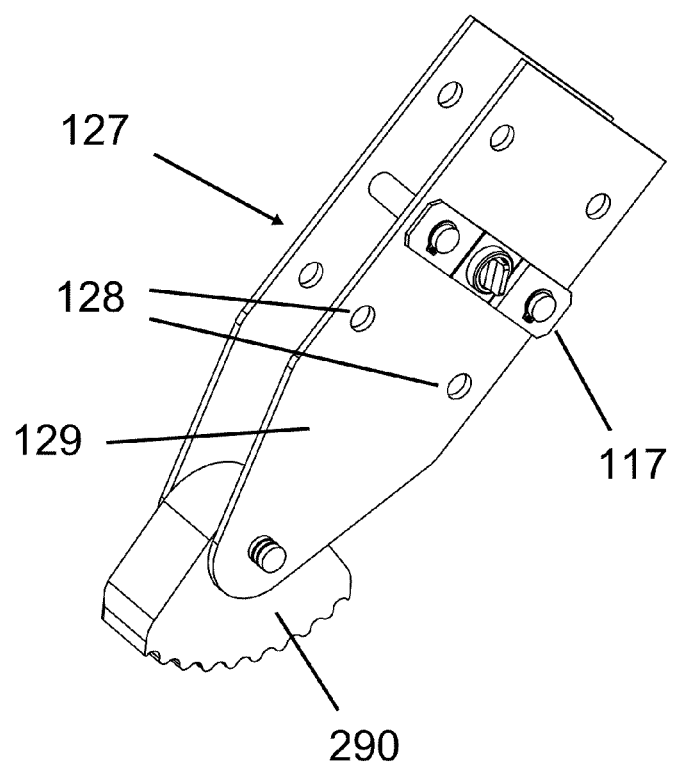
FIG. 29 shows an adjustable and removable ladder foot assembly.
Figure 30:
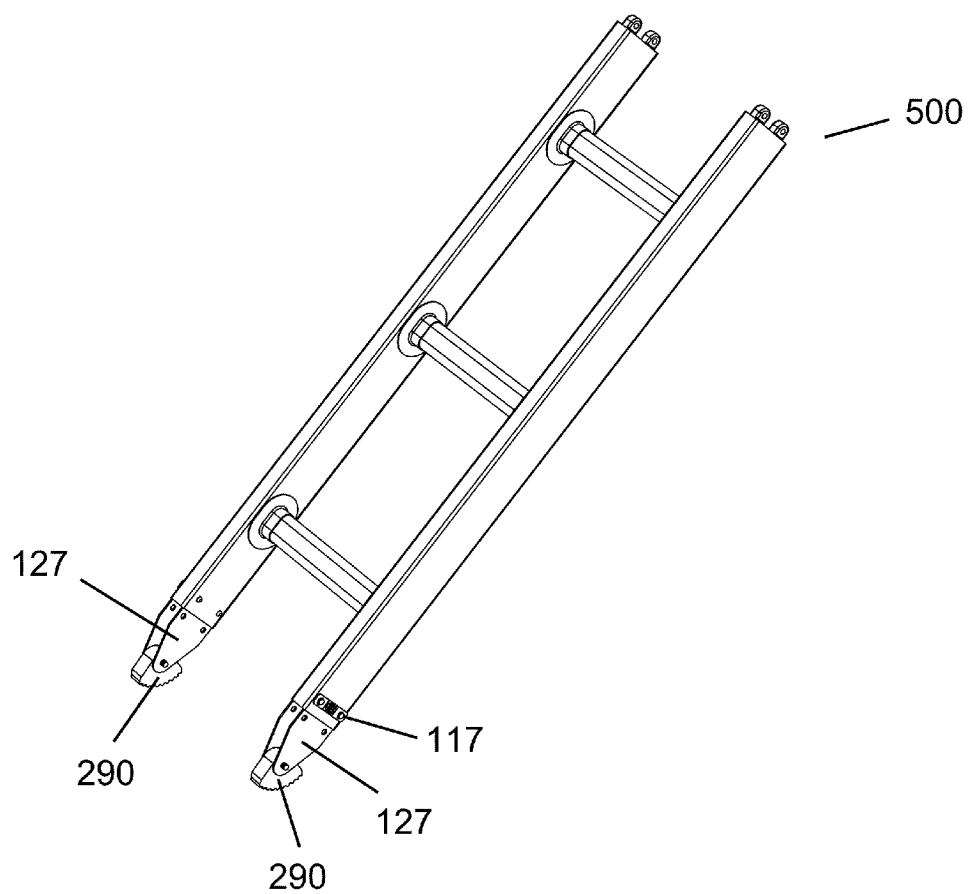
FIG. 30 shows the adjustable and removable ladder foot assembly of FIG. 29 installed into the terminal end of a ladder segment.

At the two terminal ends of the structure, either permanently mounted feet or removable base pieces are used. FIG. 28 shows one example of permanent feet 126, which preferably take the form of molded plastic or rubber inserts bonded into the inside of the main beams 41 with adhesive. Alternatively, removable pieces can be pinned in place. One embodiment of a removal and adjustable foot assembly 127 is shown in FIG. 29. These pieces may be adjustable to vary the height of the two side beams, for example in the event of uneven ground. Multiple mounting hole positions 128 in the foot support bracket 129 allow the pin 117 to be placed in the most desirable position for each application. This also allows the foot 290 to be completely removed from the end of the structure if necessary. FIG. 30 shows a terminal ladder segment 500 with removable/adjustable feet 290 installed.

Figure 31:
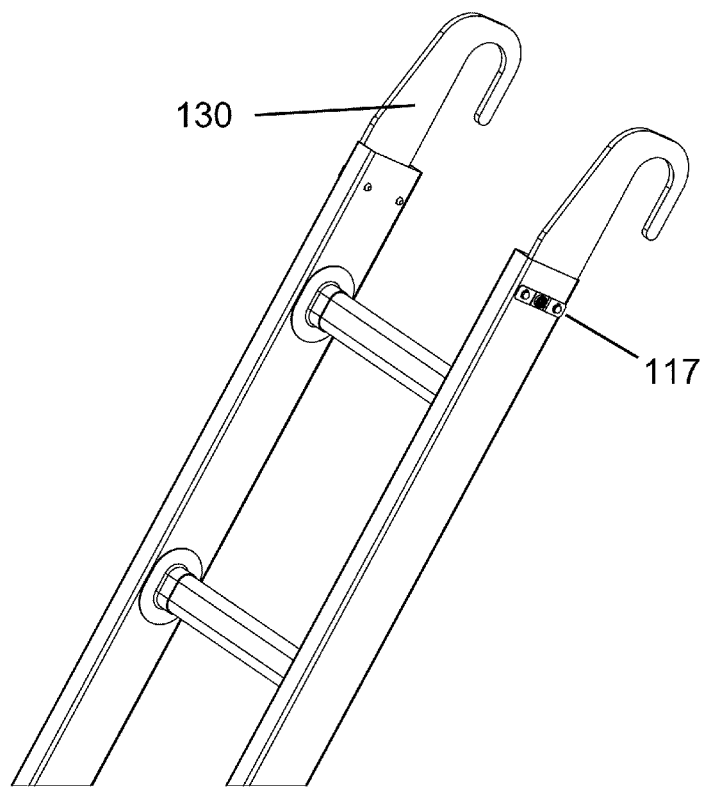
FIG. 31 shows removable ladder hooks on the terminal end of a ladder segment.

At the other terminal end of the structure, instead of feet 290, a modular element, such as a ladder hook 130, can optionally be inserted and pinned into place, as shown in FIG. 31, for example, using the pin 117 shown in FIG. 15. Alternatively, other joint connectors, including, but not limited to those discussed herein, could be used to connect the hook to the structure. The hook 130 is another modular piece of the ladder/bridge system of the present invention.

Figure 32:
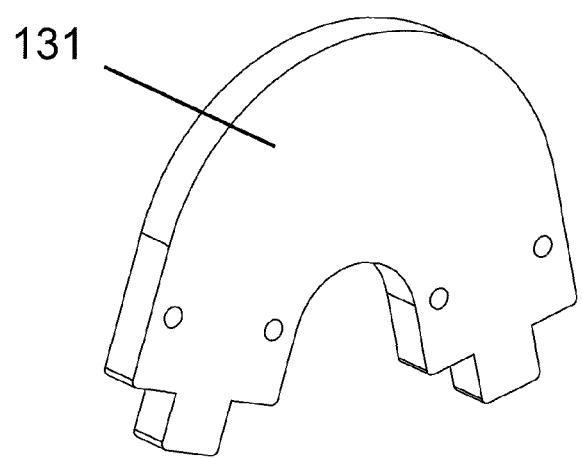
FIG. 32 shows a step ladder angle connector.
Figure 33:
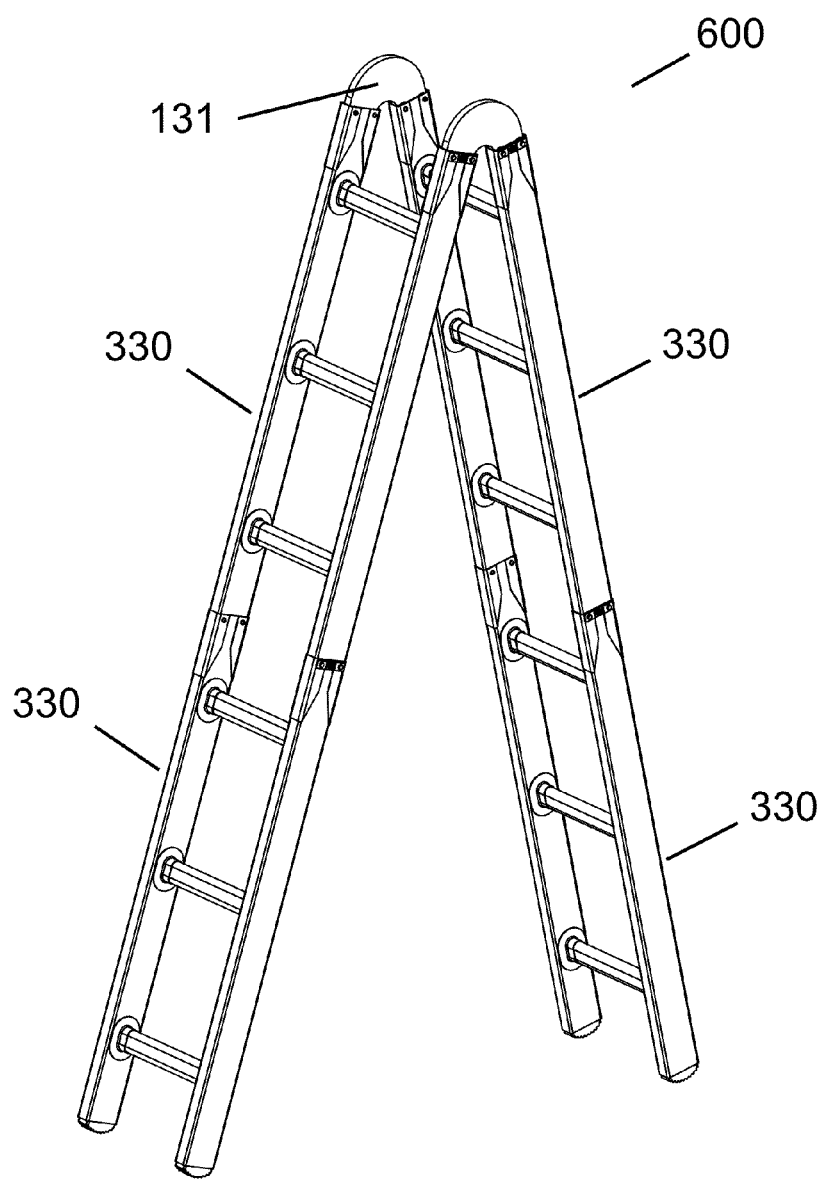
FIG. 33 shows a four-section step ladder configuration including the angle connector shown in FIG. 32.
Figure 34:
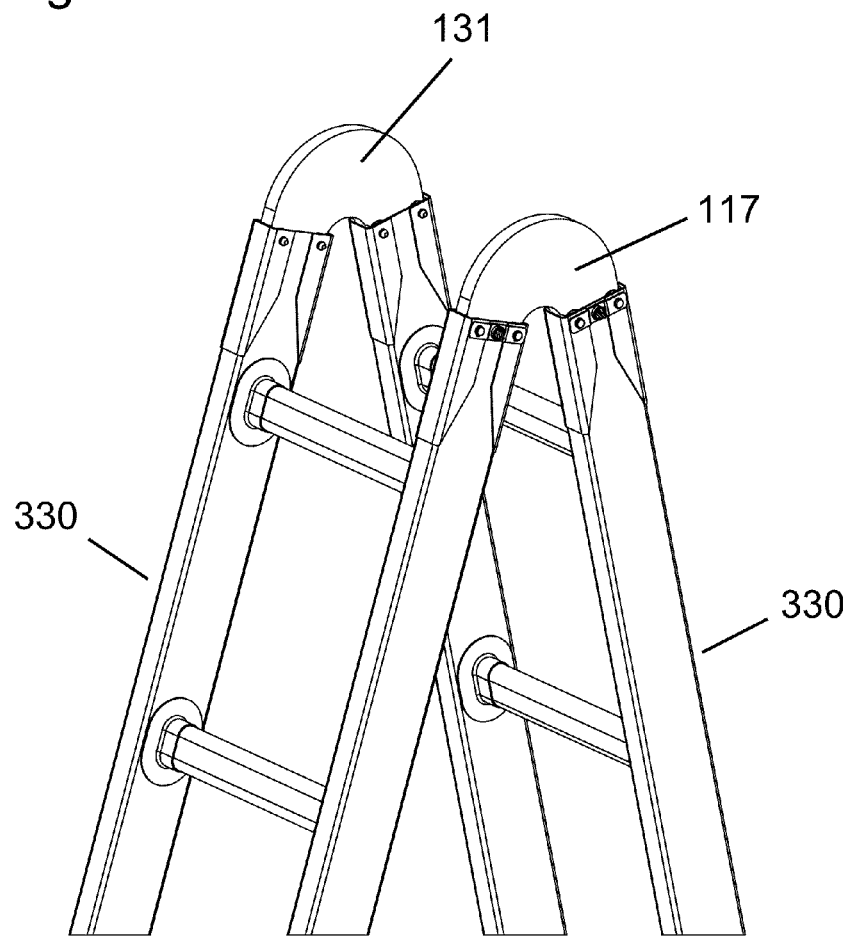
FIG. 34 shows a close-up view of the step-ladder connector joint shown in FIGS. 32 and 33.

In addition to ladders and bridges, the basic building blocks of this system can be utilized to construct a myriad of other structures. For example, scaffolding, look-out stands, and tables can also be made by connecting multiple pieces together to form legs and platforms. To facilitate this, special modular elements, such as angle connector pieces, are preferably used. FIG. 32 shows an angle connector modular element 131 used to combine the ladder segments into a step ladder 600, as shown in FIG. 33. In this case, four segments 330 (two on each side) are used to form the step ladder 600, with the step ladder connector 131 in place at the top. The connector 131 is preferably pinned in place and easily removable for disassembly. Alternatively, any number of ladder segments 330 can be used to form smaller or taller step ladders 600. FIG. 34 shows a close-up of the step ladder connector 131 in place on the ladder 600. The pin joint connector shown in FIGS. 16 and 17 is used to connect the angle connector 131 shown in FIG. 34. Alternatively, other joint connectors, including, but not limited to, the joint connectors discussed herein, could be used in combination with the angle connector 131.

Figure 35:
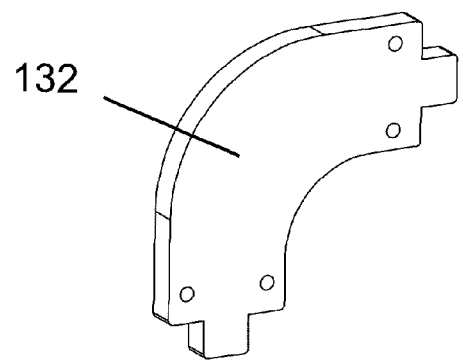
FIG. 35 shows a 90 degree angle connector.
Figure 36:
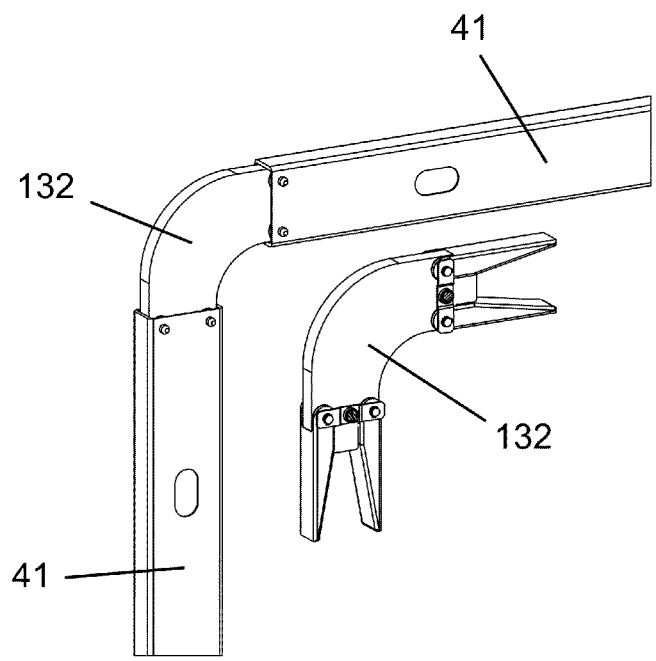
FIG. 36 shows a close-up view of the 90 degree angle connector shown in FIG. 35 with beams attached.
Figure 37:
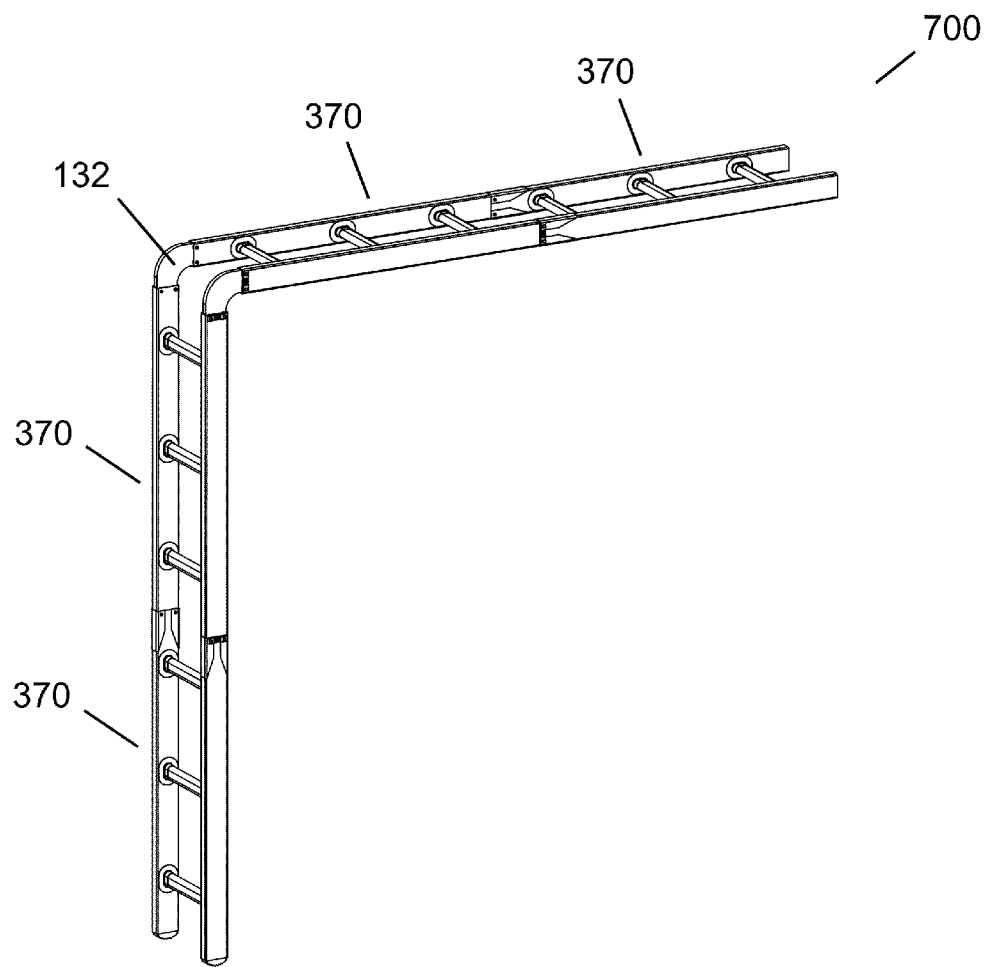
FIG. 37 shows an L-shaped structure made using a 90 degree connector and four ladder segments.
Figure 38:
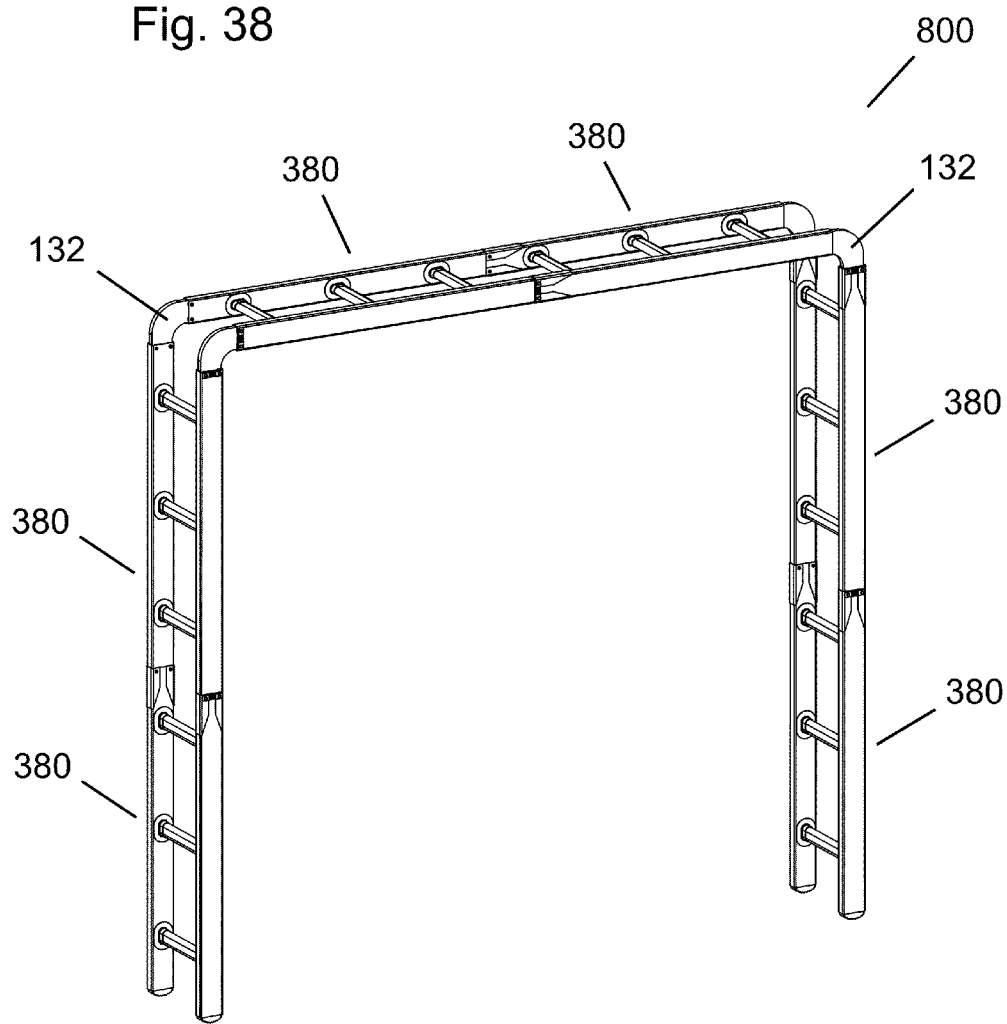
FIG. 38 shows a scaffold structure made using 90 degree connectors and six ladder segments.

In order to form other structures, modular elements, connectors, of different angles are preferably used. FIG. 35 shows a 90 degree angle connector 132. Using this connector, structures with vertical and horizontal components can be constructed. A close-up of the 90 degree angle connector 132 in use is shown in FIG. 36. This connector is similar to the one shown in FIGS. 15-17, with the addition of the 90 degree angle portion 132. An assembled L-shaped structure 700 with four segments 370 is shown in FIG. 37. FIG. 38 shows a scaffold structure 800 with 90 degree connectors 132 and six segments 380. Both of these structures 700 and 800 are made possible by the ladder/bridge connector system discussed herein. In a preferred embodiment, to facilitate greater stability for the user, a solid panel 133 is preferably added over top of the rungs on the horizontal components, as shown in the scaffold structure 900 in FIG. 39 This provides better footing when standing on the top of the structure 900.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.)

What is claimed is:
1. A modular system comprising:
a) a plurality of carbon fiber tubes, each carbon fiber tube having a first end and a second end;
b) a joint connector located at least one of the first end and the second end of each carbon fiber tube; and
c) at least one modular element, wherein the modular element mates with at least one joint connector;
wherein the joint connector on an end of a first carbon fiber tube is shaped to fit inside an adjoining carbon fiber tube, or mates either with the joint connector on a second carbon fiber tube or with the modular element to form a structure;
wherein at least one of the carbon fiber tubes comprises:
i) an inner carbon fiber layer; and
ii) an outer carbon fiber layer; and
wherein at least one of the inner and outer carbon fiber layers comprises a braided carbon fiber material.

2. The modular system of claim 1, wherein the joint connector comprises a locking element that locks each carbon fiber tube to an adjoining carbon fiber tube of the structure.

3. The modular system of claim 1, wherein the joint connector comprises a pin joint connector.

4. The modular system of claim 1, wherein at least one of the modular elements is structured such that adjoining carbon fiber tubes meet at an angle.

5. The modular system of claim 1, wherein the modular element comprises a hook connected to the joint connector on at least one of the carbon fiber tubes.

6. The modular system of claim 1, wherein the modular system further comprises a pair of feet, wherein the feet are located on a bottom end of at least one of the carbon fiber tubes such that the feet provide friction for the structure when the feet are placed on the ground.

7. The modular system of claim 1, wherein the joint connector comprises a pair of male joint connectors having a first end connected to an interior surface of the first carbon fiber tube and a second end protruding from an end of the first carbon fiber tube, the second end of the male joint connector having at least one hole formed therein such that, when the second end of the male joint connector is inserted into an interior surface of the second carbon fiber tube, it is secured in place by insertion of pins through the second end of the male joint connector and mating holes in the second carbon fiber tube.

8. The modular system of claim 1, wherein the modular system is a modular ladder system comprising:
a) at least two ladder segments, each ladder segment comprising:
i) a pair of carbon fiber tubes forming a pair of tubular carbon fiber side rails, each carbon fiber side rail having a first end and a second end;

ii) at least one carbon fiber rung perpendicular to the carbon fiber side rails, wherein the carbon fiber rung connects the carbon fiber side rails of the ladder segment;

wherein the joint connector on an end of the first carbon fiber side rail of a first ladder segment is shaped to fit inside the carbon fiber side rail of an adjoining ladder segment or mates either with the joint connector on the second carbon fiber side rail of a second ladder segment or with the modular element to form the structure.

9. The modular system of claim 7, wherein the male joint connectors are bonded to the interior surface of the first carbon fiber tube.

10. The modular system of claim 7, further comprising a pair of reinforcement gussets on an exterior of the second carbon fiber tube.

11. The modular system of claim 7, further comprising a plurality of ridge guides on a top of each male joint connector.

12. The modular system of claim 7, further comprising a dual-pin connector, wherein the dual pin connector comprises a fastener and a bracket having a pair of holes for inserting the pins and a third hole for inserting the fastener such that the second end of the male joint connector is secured in place by insertion of the fastener through a hole in the second end of the male joint connector and mating holes in the second carbon fiber tube.

13. The modular system of claim 12, wherein the fastener is a Zeus-type turn fastener.

14. The modular system of claim 7, further comprising a pair of internal brackets connected to the interior surface of the second carbon fiber tube.

15. The modular system of claim 7, further comprising mounting fasteners permanently mounting the joint connector to the carbon fiber tube.

16. The modular system of claim 7, wherein the joint connector comprises a plurality of machined flat plates.

17. The modular system of claim 8, wherein at least one of the joint connectors is structured to connect two adjoining ladder segments at a 90 degree angle such that one ladder segment is a horizontal ladder segment that further comprises at least one solid panel on top of the at least one rung.

18. The modular system of claim 8, wherein the joint connector on the end of the first carbon fiber side rail of the first ladder segment comprises a locking element that locks the ladder segment to the joint connector on the second carbon fiber side rail of the second ladder segment or to the modular element.

19. The modular system of claim 8, wherein a first joint connector comprises a female connection and a second joint connector comprises a male connection.

20. The modular system of claim 8, wherein the joint connector comprises a pin joint connector.

21. The modular system of claim 8, wherein at least one of the joint connectors is structured such that adjoining ladder segments meet at an angle.

22. The modular system of claim 21, wherein adjoining ladder segments meet at a 90 degree angle.

23. The modular system of claim 21, wherein the modular element comprises a curved angle connector.

24. The modular system of claim 23, wherein the joint connector comprises a splice connection, wherein approximately half of a length of the splice connection is bonded into an end of the carbon fiber side rail and the other half of the splice connection is shaped to fit inside the carbon fiber side rail of an adjoining ladder segment.

25. The modular system of claim 24, wherein the splice connection is filled with a core material.

26. The modular system of claim 23, wherein at least one of the carbon fiber side rails, the joint connector, and the carbon fiber rung is filled with a core material.

27. The modular system of claim 23, further comprising a plurality of carbon fiber gussets connecting the rung to the side rails.

28. The modular system of claim 23, wherein a portion of the rung is located inside each of the carbon fiber side rails and is bonded to an interior of each carbon fiber side rail.

29. The modular system of claim 23, further comprising a carbon fiber flange on each side of the rung that matches a contour of the rung.

30. The modular system of claim 23, further comprising a pair of feet, wherein the feet are located on a bottom end of the pair of carbon fiber side rails such that the feet provide friction for the structure when the feet are placed on the ground.

31. The modular system of claim 23, wherein the modular element comprises a hook connected to the joint connector on a top end of the pair of carbon fiber side rails.

32. The modular system of claim 23, wherein the side rails and the rung are permanently connected by bonding.

33. The modular system of claim 1, wherein the inner carbon fiber layer and the outer carbon fiber layer comprise a carbon fiber braided material.

34. The modular system of claim 1, wherein the outer carbon fiber layer comprises a braided carbon fiber material and the inner carbon fiber layer comprises a material selected from the group consisting of a braided carbon-fiber material and a plain-weave carbon fiber material.

35. A modular ladder system comprising:
a) at least two ladder segments, wherein each ladder segment comprises:
   i) a plurality of carbon fiber tubes, each carbon fiber tube having a first end and a second end, wherein each pair of carbon fiber tubes forms a pair of tubular carbon fiber side rails; and
   ii) at least one carbon fiber rung perpendicular to the carbon fiber side rails, wherein the carbon fiber rung connects the carbon fiber side rails of the ladder segment; and
b) a joint connector located at least one of the first end and the second end of each carbon fiber side rail;
wherein the joint connector on an end of the first carbon fiber side rail of a first ladder segment is shaped to fit inside the carbon fiber side rail of an adjoining ladder segment or mates with the joint connector on the second carbon fiber side rail of a second ladder segment; and
wherein at least one of the carbon fiber side rails or the carbon fiber rung comprises:
   i) an inner carbon fiber layer;
   ii) an outer carbon fiber layer; and
   iii) a plurality of carbon fiber strips sandwiched between the inner carbon fiber layer and the outer carbon fiber layer.

36. The modular system of claim 35, wherein the inner carbon fiber layer and the outer carbon fiber layer comprise a carbon fiber woven material.

37. The modular system of claim 35, wherein the outer carbon fiber layer comprises a braided carbon fiber material and the inner carbon fiber layer comprises a material selected from the group consisting of a braided carbon-fiber material and a plain-weave carbon fiber material.

38. The modular system of claim 35, further comprising at least one modular element that mates with at least one joint connector.

39. A modular ladder system comprising:
a) at least two ladder segments, wherein each ladder segment comprises:
   i) a plurality of carbon fiber tubes, each carbon fiber tube having a first end and a second end, wherein each pair of carbon fiber tubes forms a pair of tubular carbon fiber side rails; and
   ii) at least one carbon fiber rung perpendicular to the carbon fiber side rails, wherein the carbon fiber rung connects the carbon fiber side rails of the ladder segment; and
b) a joint connector located at least one of the first end and the second end of each carbon fiber side rail;
wherein the joint connector on an end of the first carbon fiber side rail of a first ladder segment is shaped to fit inside the carbon fiber side rail of an adjoining ladder segment or mates with the joint connector on the second carbon fiber side rail of a second ladder segment; and
wherein at least one of the carbon fiber side rails or the carbon fiber rung comprises:
   i) an inner carbon fiber layer;
   ii) an outer carbon fiber layer; and
   iii) a layer of uni-directional carbon fiber material surrounding the inner carbon fiber layer.

40. The modular system of claim 39, further comprising at least one modular element that mates with at least one joint connector.

41. A modular ladder system comprising:
a) at least two ladder segments, wherein each ladder segment comprises:
   i) a plurality of carbon fiber tubes, each carbon fiber tube having a first end and a second end, wherein each pair of carbon fiber tubes forms a pair of tubular carbon fiber side rails; and
   ii) at least one carbon fiber rung perpendicular to the carbon fiber side rails, wherein the carbon fiber rung connects the carbon fiber side rails of the ladder segment; and
b) a joint connector located at least one of the first end and the second end of each carbon fiber side rail;
wherein the joint connector on an end of the first carbon fiber side rail of a first ladder segment is shaped to fit inside the carbon fiber side rail of an adjoining ladder segment or mates with the joint connector on the second carbon fiber side rail of a second ladder segment; and
wherein at least one of the carbon fiber side rails or the carbon fiber rung comprises:
   i) an inner carbon fiber layer; and
   ii) an outer carbon fiber layer; and
wherein at least one of the inner and outer carbon fiber layers comprises a braided carbon fiber material.

42. The modular system of claim 41, further comprising at least one layer of uni-directional carbon fiber material placed between the inner carbon fiber layer and the outer carbon fiber layer.

43. The modular system of claim 41, wherein the joint connector on the end of the first carbon fiber side rail of the first ladder segment comprises a locking element that locks the ladder segment to the joint connector on the second carbon fiber side rail of the second ladder segment.

44. The modular system of claim 41, wherein the joint connector comprises a pin joint connector.

45. The modular system of claim 41, wherein at least one of the joint connectors is structured such that adjoining ladder segments meet at an angle.

46. The modular system of claim 41, wherein adjoining ladder segments meet at a 90 degree angle.

47. The modular system of claim 41, wherein the joint connector comprises a splice connection, wherein approximately half of a length of the splice connection is bonded into an end of the carbon fiber side rail and the other half of the splice connection is shaped to fit inside the carbon fiber side rail of an adjoining ladder segment.

48. The modular system of claim 47, wherein the splice connection is filled with a core material.

49. The modular system of claim 41, wherein at least one of the carbon fiber side rails, the joint connector, and the carbon fiber rung is filled with a core material.

50. The modular system of claim 41, further comprising a plurality of carbon fiber gussets connecting the rung to the side rails.

51. The modular system of claim 41, wherein a portion of the rung is located inside each of the carbon fiber side rails and is bonded to an interior of each carbon fiber side rail.

52. The modular system of claim 41, further comprising a carbon fiber flange on each side of the rung that matches a contour of the rung.

53. The modular system of claim 41, further comprising a pair of feet, wherein the feet are located on a bottom end of the pair of carbon fiber side rails such that the feet provide friction for the structure when the feet are placed on the ground.

54. The modular system of claim 41, wherein the side rails and the rung are connected by bonding.

55. The modular system of claim 41, further comprising a modular element that mates with at least one joint connector.

56. A modular system comprising:
a) a plurality of carbon fiber tubes, each carbon fiber tube having a first end and a second end; and
b) a joint connector located at least one of the first end and the second end of each carbon fiber tube;
wherein the joint connector on an end of a first carbon fiber tube is shaped to fit inside an adjoining carbon fiber tube or mates with the joint connector on a second carbon fiber tube;
wherein at least one of the carbon fiber tubes comprises:
i) an inner carbon fiber layer; and
ii) an outer carbon fiber layer; and
wherein at least one of the inner and outer carbon fiber layers comprises a braided carbon fiber material.

* * * * *

UNITED STATES PATENT AND TRADEMARK OFFICE
CERTIFICATE OF CORRECTION

PATENT NO. : 8,448,748 B2
APPLICATION NO. : 12/646026
DATED : May 28, 2013
INVENTOR(S) : Allred, III et al.

Page 1 of 2

It is certified that error appears in the above-identified patent and that said Letters Patent is hereby corrected as shown below:

In the Claims:

Claim 1 (Column 10, line 20): replace "connector located at least one" with "connector located at at least one"

Claim 24 (Column 11, line 60): replace "of claim 23" with "of claim 8"

Claim 26 (Column 12, line 1): replace "of claim 23" with "of claim 8"

Claim 27 (Column 12, line 4): replace "of claim 23" with "of claim 8"

Claim 28 (Column 12, line 7): replace "of claim 23" with "of claim 8"

Claim 29 (Column 12, line 10): replace "of claim 23" with "of claim 8"

Claim 30 (Column 12, line 13): replace "of claim 23" with "of claim 8"

Claim 31 (Column 12, line 17): replace "of claim 23" with "of claim 8"

Claim 32 (Column 12, line 20): replace "of claim 23" with "of claim 8"

Claim 35 (Column 12, line 43): replace "connector located at least one" with "connector located at at least one"

Claim 39 (Column 13, line 12): replace "connector located at least one" with "connector located at at least one"

Claim 41 (Column 13, line 39): replace "connector located at least one" with "connector located at at least one"

Signed and Sealed this
Twenty-third Day of July, 2013

Teresa Stanek Rea
*Acting Director of the United States Patent and Trademark Office*

Claim 56 (Column 14, line 44): replace "connector located at least one" with "connector located at at least one"